(12) United States Patent
Kondo et al.

(10) Patent No.: US 7,599,987 B2
(45) Date of Patent: Oct. 6, 2009

(54) INFORMATION PROCESSING DEVICE FOR OBTAINING HIGH-QUALITY CONTENT

(75) Inventors: Tetsujiro Kondo, Tokyo (JP); Koji Ohta, Tokyo (JP)

(73) Assignee: Sony Corporation, Tokyo (JP)

( * ) Notice: Subject to any disclaimer, the term of this patent is extended or adjusted under 35 U.S.C. 154(b) by 804 days.

(21) Appl. No.: 10/203,116

(22) PCT Filed: Dec. 5, 2001

(86) PCT No.: PCT/JP01/10602

§ 371 (c)(1),
(2), (4) Date: Nov. 25, 2002

(87) PCT Pub. No.: WO02/46961

PCT Pub. Date: Jun. 13, 2002

(65) Prior Publication Data

US 2003/0140148 A1 Jul. 24, 2003

(30) Foreign Application Priority Data

Dec. 6, 2000 (JP) ............................. 2000-371263

(51) Int. Cl.
G06F 15/16 (2006.01)
G06F 17/30 (2006.01)
H04H 60/32 (2008.01)

(52) U.S. Cl. ..................... 709/203; 709/217; 707/2; 707/6; 725/14

(58) Field of Classification Search ................ 709/203, 709/217, 224; 707/2, 6; 725/14
See application file for complete search history.

(56) References Cited

U.S. PATENT DOCUMENTS

| 5,710,884 | A | * | 1/1998 | Dedrick ...................... 709/217 |
| 5,721,827 | A | * | 2/1998 | Logan et al. ................. 709/217 |
| 5,754,938 | A | * | 5/1998 | Herz et al. ................... 725/116 |

(Continued)

FOREIGN PATENT DOCUMENTS

| JP | 10-327189 | 12/1998 |
| JP | 11-312177 | 11/1999 |
| JP | 2000-112972 | 4/2000 |
| JP | 2000-112976 | 4/2000 |
| JP | 2000-331008 | 11/2000 |

OTHER PUBLICATIONS

Atsuko Shiba, Bibliographic search system reflecting the preference of users, No. 52 (first half of 1996) National convention lecture memoirs (6) Mar. 6-8, 1996, Japan, Information Processing Society of Japan, Mar. 6, 1996, pp. 6-373-6-374.

Yusuke Ariyoshi, Accuracy improvement using the reliability of the configuration information filter mode, Information Processing Society memoir, Japan, Information Processing Society of Japan, Mar. 1, 1999, vol. 99, No. 20, pp. 25-32.

Primary Examiner—Kevin Bates
(74) Attorney, Agent, or Firm—Frommer Lawrence & Haug LLP; William S. Frommer; Thomas F. Presson

(57) ABSTRACT

An information processing apparatus which allows high-quality contents to be easily obtained. A WWW browser section sends search request information which includes a keyword for web pages, input by the user, to an evaluation and search server. A search section of the evaluation and search server receives the search request information through a transmitting and receiving control section, and searches a WWW data base for web pages corresponding to the reported keyword. The search section reports the URLS, access information, of web pages obtained as a search result, to an evaluation section to request the calculation of an evaluation value for each web page. The search section generates search result information including evaluation from the access information of the web pages obtained as a search result and the evaluation value for each web page, and sends it to the WWW browser section through the transmitting and receiving control section.

38 Claims, 27 Drawing Sheets

U.S. PATENT DOCUMENTS

| | | | |
|---|---|---|---|
| 5,790,426 A * | 8/1998 | Robinson | 707/E17.059 |
| 5,796,952 A * | 8/1998 | Davis et al. | 709/224 |
| 5,867,799 A * | 2/1999 | Lang et al. | 707/1 |
| 6,178,424 B1 * | 1/2001 | Okumura et al. | 707/10 |
| 6,438,579 B1 * | 8/2002 | Hosken | 709/203 |
| 6,539,375 B2 * | 3/2003 | Kawasaki | 707/5 |
| 6,546,390 B1 * | 4/2003 | Pollack et al. | 707/7 |
| 6,587,127 B1 * | 7/2003 | Leeke et al. | 715/765 |
| 6,606,657 B1 * | 8/2003 | Zilberstein et al. | 709/224 |
| 6,718,551 B1 | 4/2004 | Swix et al. | |
| 6,801,909 B2 * | 10/2004 | Delgado et al. | 707/4 |
| 6,938,021 B2 * | 8/2005 | Shear et al. | 705/67 |
| 6,941,321 B2 * | 9/2005 | Schuetze et al. | 707/103 R |
| 6,947,922 B1 * | 9/2005 | Glance | 707/3 |
| 6,983,478 B1 * | 1/2006 | Grauch et al. | 725/13 |
| 2001/0032204 A1 * | 10/2001 | Hoashi et al. | 707/5 |

* cited by examiner

FIG. 7

| OPERATION CONTENTS | EVALUATION (-10 TO +10) |
|---|---|
| GLANCED AND THEN JUMPED TO NEXT PAGE | -10 |
| ENTERED INTO BOOKMARK | +10 |
| PRINTED OR SAVED PAGE | +8 |
| OPERATED FREQUENTLY (READ IN INTENSIVE MANNER) | +7 |
| READ FOR LONG PERIOD | +5 |
| BROWSED MANY TIMES WITHIN FIXED PERIOD | +3 |

(A) HIGH-EVALUATION LIST OF USER A

| WEB PAGE | EVALUATION VALUE |
|---|---|
| URL1 | 100 |
| URL2 | 100 |
| URL3 | 98 |
| URL4 | 95 |
| ⋮ | ⋮ |

(B) HIGH-EVALUATION LIST OF USER B

| WEB PAGE | EVALUATION VALUE |
|---|---|
| URL2 | 98 |
| URL3 | 97 |
| URL20 | 95 |
| URL1 | 93 |
| ⋮ | ⋮ |

↓

NUMBER OF COMMON WEB PAGES

↓

DEGREE OF PREFERENCE MATCH BETWEEN USER A AND USER B

FIG. 13

| COMMON WEB PAGES | DEGREE OF PREFERENCE MATCH |
|---|---|
| 10 OR MORE | 1.0 |
| NINE | 0.9 |
| EIGHT | 0.8 |
| SEVEN | 0.7 |
| ⋮ | ⋮ |
| ONE | 0.1 |
| ZERO | 0.0 |

FIG. 22

| OPERATION CONTENTS | EVALUATION (-10 TO +10) |
|---|---|
| CHANNEL WAS CHANGED IMMEDIATELY AFTER CM WAS BROADCASTED | +10 |
| CHANNEL WAS SELECTED AFTER CHANNEL WAS CONTINUOUSLY SWITCHED | +10 |
| ⋮ | ⋮ |

FIG. 26

| OPERATION CONTENTS | EVALUATION (-10 TO +10) |
|---|---|
| CONTENTS REPRODUCTION SPEED WAS CHANGED | +10 |
| REWINDED AND PLAYED BACK AT PREDETERMINED POSITION | +10 |
| PAUSED DURING PLAYBACK AND PLAYED BACK AT PAUSE POSITION | +10 |
| ⋮ | ⋮ |

INFORMATION PROCESSING DEVICE FOR OBTAINING HIGH-QUALITY CONTENT

TECHNICAL FIELD

The present invention relates to information processing apparatuses, and more particularly, to an information processing apparatus which allows higher-quality contents to be easily obtained.

BACKGROUND ART

As computers and Internet technologies have advanced in these years, individuals have been able to easily send information (contents), and the amount of contents available for users have been rapidly increasing.

Although the amount of contents have been rapidly increasing and they can be freely used, there are many low-quality contents.

Therefore, it may be a good idea to evaluate the quality of contents and provide the result for the users. It is, however, very time-consuming for people to view and evaluate a huge amount of contents. In addition, person's evaluation depends on the evaluator's preference.

DISCLOSURE OF INVENTION

The present invention has been made in consideration of the above situation. It is an object of the present invention to provide evaluation information corresponding to the users to allow the users to easily obtain high-quality contents.

A first information processing apparatus according to the present invention is characterized by including viewing-action-information collecting means for collecting viewing-action information representing the viewing action of the user for contents, and evaluation calculation means for calculating the evaluation value of each user for the contents according to the viewing-action information collected by the viewing-action-information collecting means.

The viewing-action-information collecting means can be configured such that it collects information representing a time when the user outputs the contents, as the viewing-action information.

The viewing-action-information collecting means can be configured such that it collects operation information representing the content of an operation applied by the user to an output apparatus where the contents are output, as the viewing-action information.

The viewing-action-information collecting means can be configured such that it collects the operation information in which the user specifies recording of the contents.

The evaluation calculation means can be configured such that it calculates the average of the evaluation values of a plurality of users for the contents.

The information processing apparatus can be configured such that it further includes evaluation-information storage means for storing evaluation information representing the evaluation value calculated by the evaluation calculation means, and evaluation-information providing means for providing the evaluation information stored by the evaluation-information storage means.

The information processing apparatus can be configured such that the evaluation-information storage means stores an evaluation-information list formed of a predetermined number of the evaluation information in the descending order of the evaluation value, for each user, and the evaluation-information providing means provides each user with the corresponding list among the evaluation-information lists stored by the evaluation-information storage means.

The information processing apparatus can be configured such that it further includes degree-of-similarity calculation means for calculating the degrees of similarity of preferences between a focused-on user being focused on and other users according to the evaluation-information list of the focused-on user and those of the other users, stored by the evaluation-information storage means, and the evaluation calculation means weights the evaluation values of the other users for predetermined contents according to the degrees of similarity calculated by the degree-of similarity calculation means, and adds obtained values to calculate the evaluation value of the focused-on user for the predetermined contents.

The information processing apparatus can be configured such that the evaluation-information storage means stores the evaluation information for web-page information, calculated by the evaluation calculation means, and the evaluation-information providing means provides an URL which specifies web-page information corresponding to a predetermined condition, and the evaluation information of each user for the web-page information corresponding to the condition.

The viewing-action-information collecting means can be configured such that it collects information representing a time when the user outputs the web-page information, as the viewing-action information.

The viewing-action-information collecting means can be configured such that it collects information indicating that the user specifies that the web-page information be entered into a bookmark, as the viewing-action information.

The viewing-action-information collecting means can be configured such that it collects information indicating that the user specifies that the web-page information be printed, as the viewing-action information.

The viewing-action-information collecting means can be configured such that it collects information indicating that the user specifies that the web-page information be saved, as the viewing-action information.

The information processing apparatus can be configured such that the viewing-action-information collecting means collects information representing a viewing action applied by the user, in a receiving and reproduction apparatus for receiving broadcasting contents and reproducing them, to the broadcasting contents, as the viewing-action information, and the evaluation calculation means calculates the evaluation value of each user for the broadcasting contents according to the viewing-action information collected by the viewing-action-information collecting means.

The information processing apparatus can be configured such that the viewing-action-information collecting means collects switching-timing information representing timing when the channel for the broadcasting contents is switched, as the viewing-action information and the evaluation calculation means calculates the evaluation value according to the switching-timing information.

The evaluation calculation means can be configured such that, when the switching-timing information indicates that the channel has been switched immediately after a predetermined commercial message was broadcasted, the evaluation calculation means increases the evaluation value for the broadcasting contents which had been broadcasted immediately before the commercial message was broadcasted, by a predetermined value.

The evaluation calculation means can be configured such that, when the switching-timing information indicates that certain broadcasting contents have been selected after the channel was continuously switched, the evaluation calculation means increases the evaluation value for the selected broadcasting contents, by a predetermined value.

The information processing apparatus can be configured such that the viewing-action-information collecting means collects information representing operation contents applied by the user, in a reproduction apparatus for reproducing recording-medium contents stored in a predetermined recording medium, to the recording-medium contents, as the viewing-action information, and the evaluation calculation means calculates the evaluation value of each user for the recording-medium contents according to the viewing-action information collected by the viewing-action-information collecting means.

The evaluation calculation means can be configured such that it calculates the evaluation value according to the viewing-action information representing the reproduction speed of the recording-medium contents, collected by the viewing-action-information collecting means.

The evaluation calculation means can be configured such that it increases the evaluation value by a predetermined value when the viewing-action information indicates that the entire recording-medium contents or a predetermined part thereof has been repeatedly being reproduced.

The evaluation calculation means can be configured such that it increases the evaluation value by a predetermined value when the viewing-action information indicates that a predetermined part of the recording-medium contents has been fast-forwarded.

The evaluation calculation means can be configured such that it increases the evaluation value by a predetermined value when the viewing-action information indicates that the recording-medium contents have been paused.

The evaluation calculation means can be configured such that it increases the evaluation value by a predetermined value when the viewing-action information indicates that the reproduction of the recording-medium contents had been paused, and then was restarted at a paused position.

A first information processing method for an information processing apparatus according to the present invention is characterized by including a viewing-action-information collecting step of collecting viewing-action information representing the viewing action of the user for contents, and an evaluation calculation step of calculating the evaluation value of each user for the contents according to the viewing-action information collected by a process in the viewing-action-information collecting step.

A program recorded in a first recording medium according to the present invention is characterized by including a viewing-action-information collecting control step of controlling the collection of viewing-action information representing the viewing action of the user for contents, and an evaluation calculation step of calculating the evaluation value of each user for the contents according to the viewing-action information collected by a process in the viewing-action-information collecting control step.

A second information processing apparatus according to the present invention is characterized by including output means for outputting contents, viewing-action-information generation means for generating viewing-action information representing a viewing action of the user, according to an input applied to the contents output from the output means, and communication means for sending the viewing-action information generated by the viewing-action-information generation means to another information processing apparatus.

The viewing-action-information generation means can be configured such that it generates information representing a time when the output means outputs the contents, as the viewing-action information.

The viewing-action-information generation means can be configured such that it generates the viewing-action information according to operation information representing an operation content performed by the user.

The viewing-action-information generation means can be configured such that it generates the viewing-action information according to the operation information specifying recording of the contents.

The information processing apparatus can be configured such that it further includes requesting means managed by the another information processing apparatus, for requesting transmission of evaluation information representing an evaluation value serving as an evaluation for contents.

The requesting means can be configured such that it requests the another information processing apparatus to send an evaluation-information list formed of a predetermined number of the evaluation information in the descending order of the evaluation value.

The information processing apparatus can be configured such that the requesting means reports a predetermined condition related to web-page information serving as the contents, and requests the another information processing apparatus to send the evaluation information, the communication means receives an URL specifying the web-page information corresponding to the condition, and the evaluation information of each of web-page information corresponding to the condition, sent from the another information processing apparatus, and the output means outputs the URL and the evaluation information received by the communication means.

The viewing-action-information generation means can be configured such that it generates information representing a time when the output means outputs the web-page information, as the viewing-action information.

The viewing-action-information generation means can be configured such that it generates the viewing-action information according to information indicating that the user specifies that the web-page information be entered into a bookmark.

The viewing-action-information generation means can be configured such that it generates the viewing-action information according to information indicating that the user specifies that the web-page information be printed.

The viewing-action-information generation means can be configured such that it generates the viewing-action information according to information indicating that the user specifies that the web-page information be saved.

The information processing apparatus can be configured such that it further includes acquisition means for acquiring broadcasting contents, and evaluation calculation means for calculating an evaluation value for the broadcasting contents according to switching-timing information representing timing when the channel of the broadcasting contents acquired by the acquisition means is switched, the output means displays the broadcasting contents acquired by the acquisition means, and the viewing-action generation means generates the viewing-action information including the evaluation value calculated by the evaluation calculation means.

The evaluation calculation means can be configured such that, when the switching-timing information indicates that the channel has been switched immediately after a predetermined commercial message was broadcasted, the evaluation calculation means increases the evaluation value for the broadcasting contents which had been broadcasted immediately before the commercial message was broadcasted, by a predetermined value.

The evaluation calculation means can be configured such that, when the switching-timing information indicates that the channel has been continuously switched and then predetermined broadcasting contents were selected, the evaluation calculation means increases the evaluation value for the selected broadcasting contents by a predetermined value.

The information processing apparatus can be configured such that it further includes reproduction means for reproducing recording-medium contents stored in a predetermined recording medium, and evaluation calculation means for calculating an evaluation value for the recording-medium contents according to operation information representing the content of an operation applied by the user to the recording-medium contents reproduced by the reproduction means, the output means outputs the recording-medium contents reproduced by the reproduction means, and the viewing-action-information generation means generates the viewing-action information including the evaluation value calculated by the evaluation calculation means.

The evaluation calculation means can be configured such that it calculates the evaluation value according to the operation information representing the reproduction speed of the recording-medium contents.

The evaluation calculation means can be configured such that it increases the evaluation value by a predetermined value when the operation information indicates that the entire recording-medium contents or a predetermined part thereof has been repeatedly reproduced.

The evaluation calculation means can be configured such that it increases the evaluation value by a predetermined value when the operation information indicates that a predetermined part of the recording-medium contents has been fast-forwarded.

The evaluation calculation means can be configured such that it increases the evaluation value by a predetermined value when the operation information indicates that the recording-medium contents have been paused.

The evaluation calculation means can be configured such that it increases the evaluation value by a predetermined value when the operation information indicates that the reproduction of the recording-medium contents had been paused, and then was restarted at a paused position.

A second information processing method for an information processing apparatus, according to the present invention is characterized by including an output step of outputting contents, a viewing action-information generation step of generating viewing-action information representing a viewing action of the user, according to an input applied to the contents output by a process in the output step, and a communication step of sending the viewing-action information generated by a process in the viewing-action-information generation step, to another information processing apparatus.

A program recorded in a second recording medium according to the present invention is characterized by including an output step of outputting contents, a viewing-action-information generation step of generating viewing-action information representing a viewing action of the user, according to an input applied to the contents output by a process in the output step, and a communication control step of controlling transmission of the viewing-action information generated by a process in the viewing-action-information generation step, to another information processing apparatus.

In the first information processing apparatus, the first information processing method, and the program recorded in the first recording medium according to the present invention, viewing-action information representing a viewing action of the user for contents is collected, and the evaluation value of each user for the contents is calculated according to the collected viewing-action information.

In the second information processing apparatus, the second information processing method, and the program recorded in the second recording medium according to the present invention, contents are output, and viewing-action information representing a viewing action of the user is generated according to an input applied to the output contents. The generated viewing-action information is sent to another information processing apparatus.

BRIEF DESCRIPTION OF THE DRAWINGS

FIG. 7 is a view showing an example relationship between operation contents and evaluation values.

FIG. 12 is a view showing a method for calculating the degree of preference match.

FIG. 13 is a view showing example degrees of preference match.

FIG. 22 is a view showing another example relationship between operation contents and evaluation values.

FIG. 26 is a view showing still another example relationship between operation contents and evaluation values.

BEST MODE FOR CARRYING OUT THE INVENTION

Figure 1:
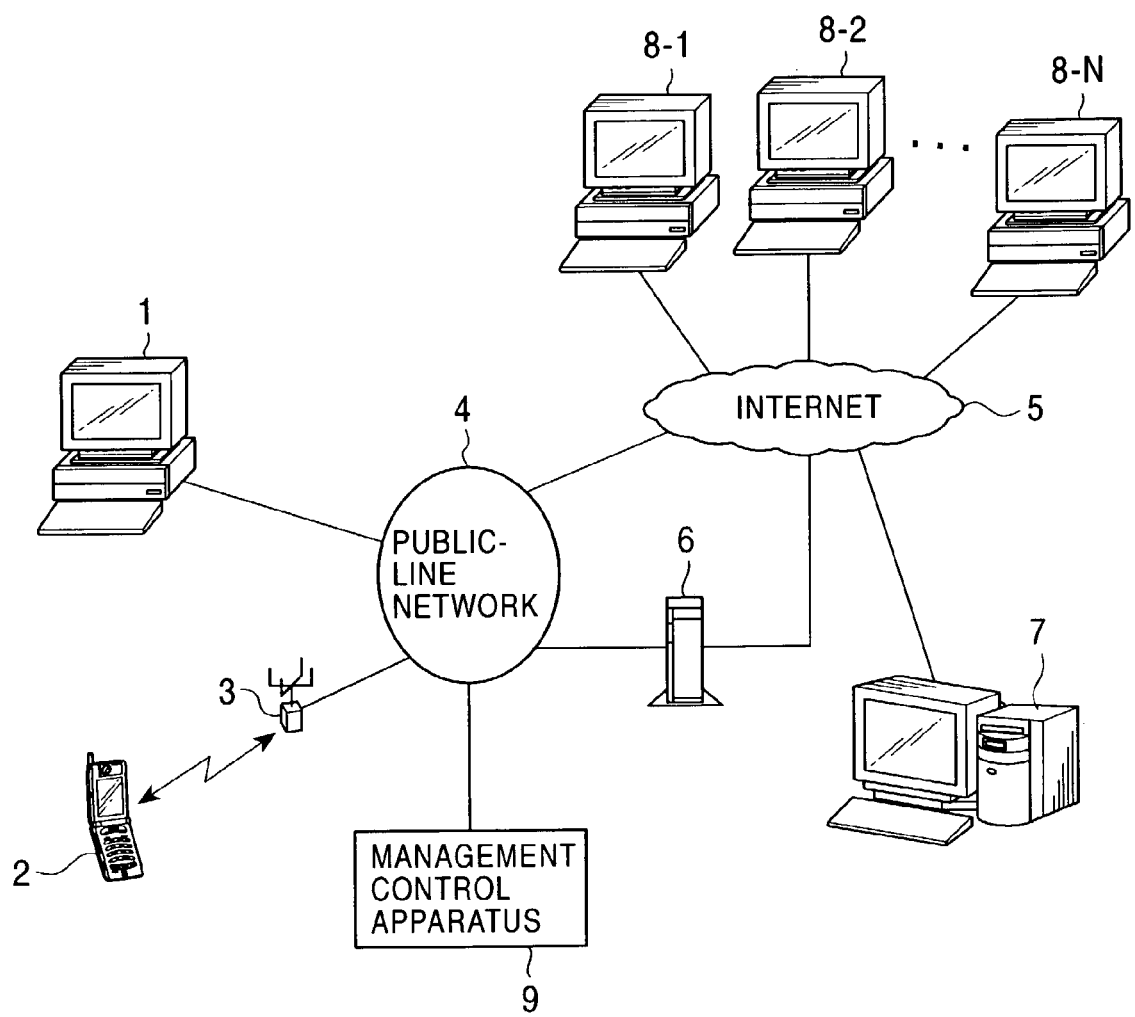
FIG. 1 is a view showing an example structure of a network system to which the present invention is applied.

FIG. 1 shows an example structure of a network system to which the present invention is applied.

A personal computer 1 is connected to a public-line network 4, and can access many WWW (world wide web) servers 8-1 to 8-N (hereinafter collectively called a WWW server 8 if it is not necessary to individually distinguish each of the WWW servers 8-1 to 8-N) connected to the Internet 5, through the public-line network 4 and an access server 6 according to a TCP/IP (transmission control protocol/Internet protocol) protocol. Therefore, the user can use the personal computer 1 to use HTML (hyper text markup language) files stored in the WWW server 8, working as various web pages.

The user can also use a portable telephone 2 to access the WWW server 8 by radio communication with a base station 3.

The base station 3 is a fixed radio station installed in each cell into which a communication-service area is divided so as to have a desired size. The portable telephone 2 serving as a mobile station is radio-connected to the base station 3 which handles a cell where the portable telephone 2 is located.

Between the portable telephone 2 and a base station 3, radio communication is performed, for example, with a code division multiple access method called W-CDMA (wideband-code division multiple access). With this method, a large quantity of data can be transferred very fast at a data transfer rate of up to 2 Mbps by the use of a 2-GHz frequency band. Since high-speed, high-quantity data communication is possible in this way, the user can use the portable telephone 2 to transfer various types of data, such as electronic mailing, browsing web pages stored in the WWW server 8, image transmission and receiving in addition to telephone calls.

The base stations 3 are connected to the public-line network 4 through wired lines. The public-line network 4 is connected to the Internet 5, to many subscriber's wired terminals not shown, to computer networks, to intra-networks, and to others. In addition, the public-line network 4 is also connected to the access server 6 owned by an Internet service provider.

The access server 6 provides a connection service to the Internet 5 by a so-called dial-up connection.

An evaluation and search server 7 is connected to the Internet 5, and has a function of a server which searches web pages stored in the WWW server 8. To function as a so-called directory-type search server, for example, the evaluation and search server 7 classifies access information, such as the URLs (uniform resource locators) of web pages, into categories in a layer structure, stores them, and searches the web pages according to a keyword reported by the user with the use of, for example, the personal computer 1. The evaluation and search server 7 can also serve as a so-called robot-type search server. In this case, a robot program recorded in the evaluation and search server 7 collects information related to the web pages of the WWW server 8 at every predetermined period, and stores the result in a data base.

In addition, the evaluation and search server 7 searches web pages according to a keyword sent from the user or others and reports a search result, and provides the user with the evaluation information of each web page obtained as a result of the search. Since the evaluation value of the quality of each web page obtained as a result of the search is indicated, for example, the user does not need to browse useless web pages.

A management control apparatus 9 is connected to the public-line network 4, and performs accounting processing for the charge of calls made by the user who uses the personal computer 1 and the portable telephone 2.

Figure 2:
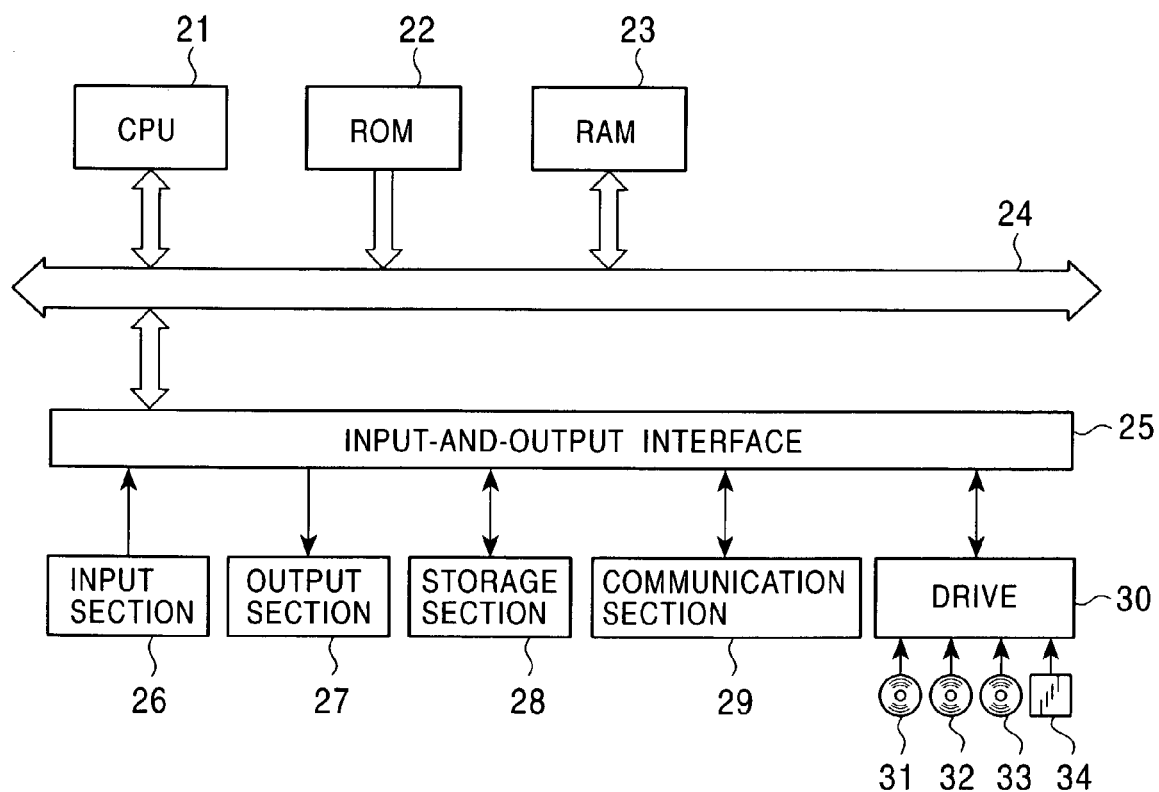
FIG. 2 is a block diagram showing an example structure of the inside of a personal computer shown in FIG. 1.

FIG. 2 is a view showing an example structure of the inside of the personal computer 1 shown in FIG. 1.

A CPU (central processing unit) 21 is connected to an input-and-output interface 25 through a bus 24. When the user operates an input section 26 formed of a keyboard, a mouse, a microphone, and others to input a command through the input-and-output interface 25, the CPU 21 develops a program stored in a ROM (read only memory) 22 into a RAM (random access memory) 23 and executes it.

The CPU 21 also develops a program stored in a storage section 28, a program transferred from the WWW server 8 through the Internet 5, the access server 6, and the public-line network 4, received by a communication section 29, and installed into the storage section 28, or a program read from various recording media mounted to a drive 30 and installed into the recording section 28, in the RAM 23 and executes it. With this, the CPU 21 performs processing conforming to flowcharts described later.

Then, as required, the CPU 21, for example, outputs the result of the processing through the input-and-output interface 25 from an output section 27 formed of a CRT (cathode ray tube), an LCD (liquid crystal display), a speaker, and others, sends the result from the communication section 29, or records the result in the storage section 28 formed of a hard disk and others.

The access server 6, the evaluation and search server 7, the WWW server 8, and the management control apparatus 9 each have structures similar to that of the personal computer 1, and an illustration and a description thereof are omitted.

Figure 3:
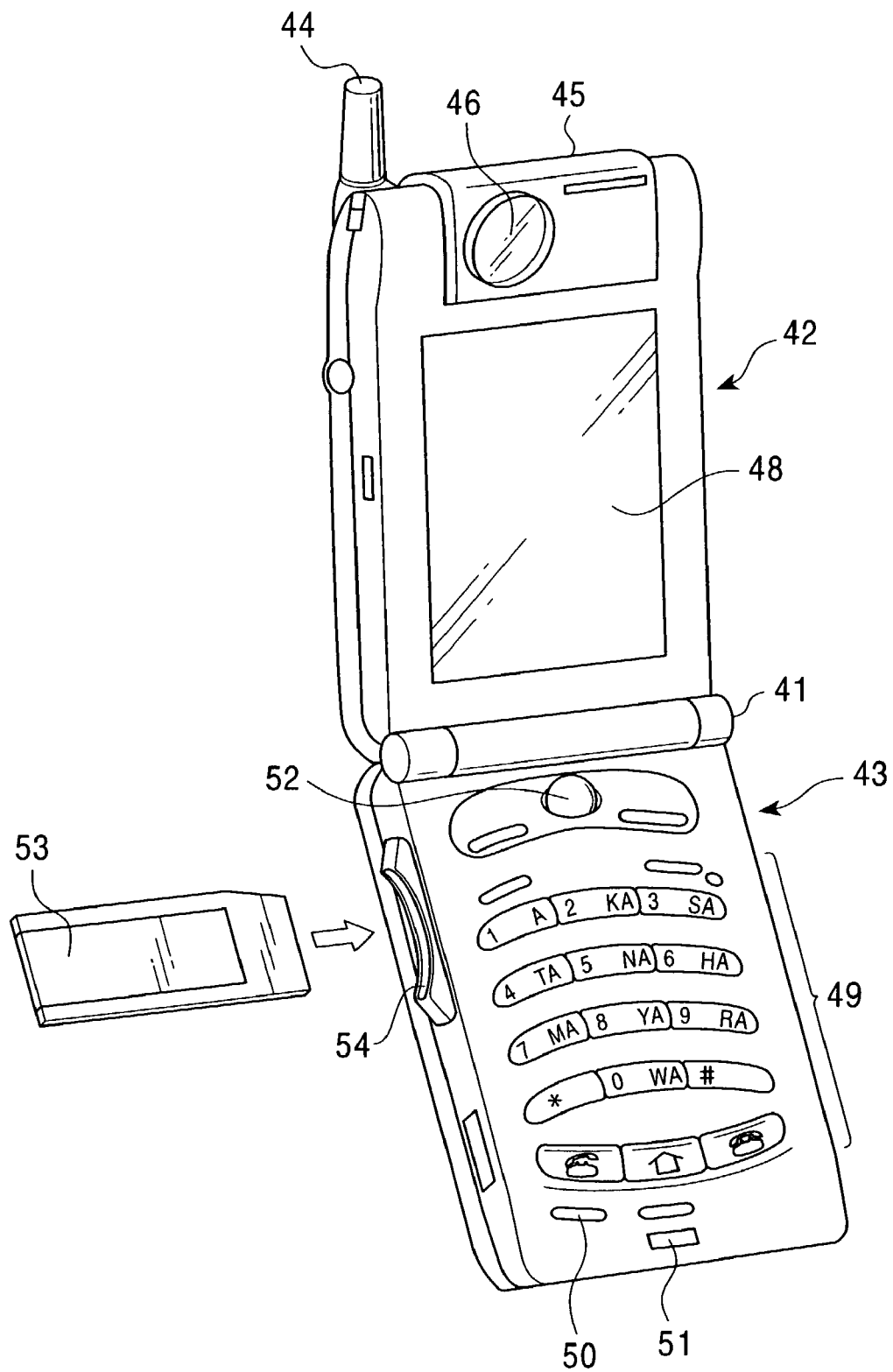
FIG. 3 is a view showing an example structure of the appearance of a portable telephone shown in FIG. 1.

FIG. 3 shows an appearance of an example structure of the portable telephone 2 shown in FIG. 1.

In FIG. 3, the portable telephone 2 is divided into a display section 42 and a body 43 at a boundary of a central hinge section 41, and is formed so as to be folded at the hinge section 41.

A transmission and receiving antenna 44 is mounted to the display section 42 at its upper left portion in an extendable and retractable state. The antenna 44 transmits and receives a radio wave to and from a base station 3. The display section 42 is also provided with a camera section 45 pivotable in an angle range of about 180 degrees at an upper central portion of the display section 42. The camera section 45 has a CCD (charge coupled device) camera 46. With this camera, the portable telephone 2 can capture an image of a desired target.

Figure 4:
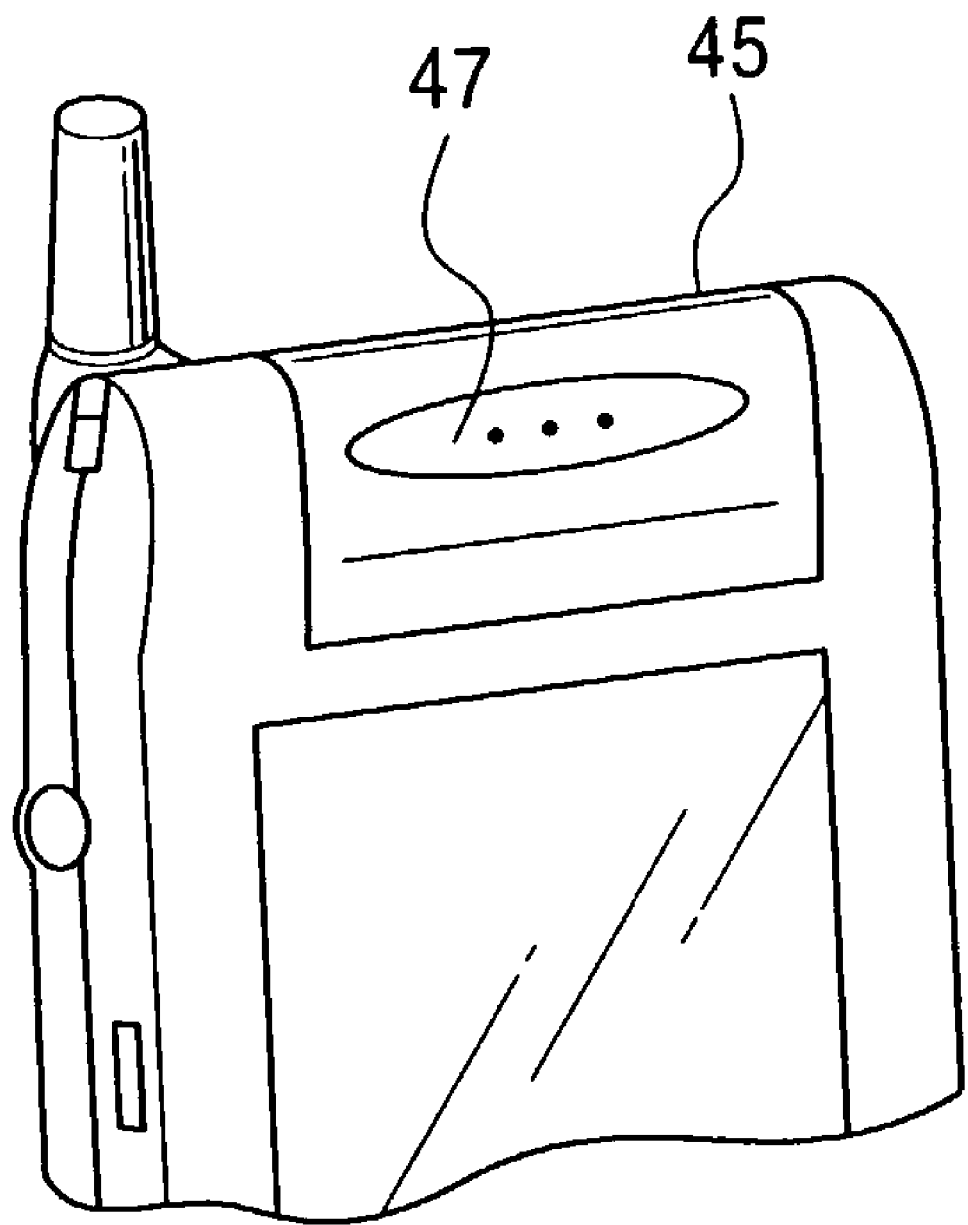
FIG. 4 is a view showing an example structure of another appearance of the portable telephone shown in FIG. 1.

A speaker 47 is provided at the surface (rear surface) opposite the surface where the CCD camera 46 is provided, of the camera section 45, as shown in FIG. 4. In other words, when the user pivots the camera section 45 by about 180 degrees from the state shown in FIG. 3, the speaker 47 provided at the center of the rear surface of the camera section 45 comes to a front side, as shown in FIG. 4, and therefore, a usual voice call is made possible.

The display section 42 is further provided with a liquid-crystal display 48 at the front side. The liquid-crystal display 48 displays, for example, a radio-wave receiving state, a remaining battery, the names and telephone numbers of parties to be called, input into a telephone book, receiving history, and others. In addition, the liquid-crystal display 48 also displays the contents of electronic mail, web pages, images captured by the CCD camera, data received by the portable telephone 2, and a cursor which indicates a predetermined position on a display screen of the liquid-crystal display 48.

The body 43 is provided with a memo button 50 and a microphone 51 below operation keys 49. The memo button 50 is operated to record the voice of the other party during a call. The microphone 51 catches the voice of the user during a call.

Further, the body 43 is provided with a rotatable trackball 52 above the operation keys 49 in a state in which the trackball slightly protrudes from a surface of the body. When the trackball 52 is rotated, various operation are performed accordingly, such as scrolling a telephone-book list and electronic mail displayed on the liquid-crystal display 48, turning web pages, and feeding an image.

The trackball 52 can be pressed toward the inside of the body 43. When the user rotates the trackball 52 to select a desired telephone number among a plurality of telephone numbers in a telephone-book list displayed on the liquid-crystal display 48, and presses the trackball 52 toward the inside of the body 43, for example, the selected telephone number is fixed in the portable telephone 2, and calling processing is automatically performed for the telephone number.

In another case, the trackball 52 is rotated, for example, to move a cursor displayed on the liquid-crystal display 48, and is pressed to click a point where the cursor is located.

At an upper portion on a left-hand side surface of the body 43, a memory-card slot 54 into which a detachable memory card 53 is inserted is provided. When the memo button 50 is pressed, the memory card 53 records the voice of the other party during a call, or records electronic mail, web pages, images captured by the CCD camera 46, data received by the portable telephone 2, and others in response to a user's operation.

The memory card 53 is a flash-memory device, which is one type of EEPROMs (electrically erasable and programmable read only memories), non-volatile memories in which data can be electrically rewritten and deleted, accommodated in a compact, thin, plastic case. Various types of data, such as image data, audio data, and programs, can be written or read into and from the memory card 53.

As the memory card 53, for example, a Memory Stick (trademark of Sony Corporation) developed by Sony Corporation, which is the applicant of the present invention, can be used. In addition, an SD Memory Card, a Compact Flash, a Smartmedia, a Multimedia Card, a Thumb Drive (all are trademarks), which are products of companies other than Sony Corporation, can also be used as the memory card 53. Instead of the memory card 53, which is a semiconductor memory, for example, a magnetic disk, such as a Micro Drive or an iD Format (trademarks), and others can also be used.

The memory card 53 is easily insertable and detachable into and from the memory-card slot 54. Therefore, data can be easily shared with other electronic units through the memory card 53.

A battery pack is mounted to the body 43 at its rear surface. When a call is finished or a power supply key is turned on, the battery pack supplies electric power to each circuit section to make it ready for operation.

Figure 5:
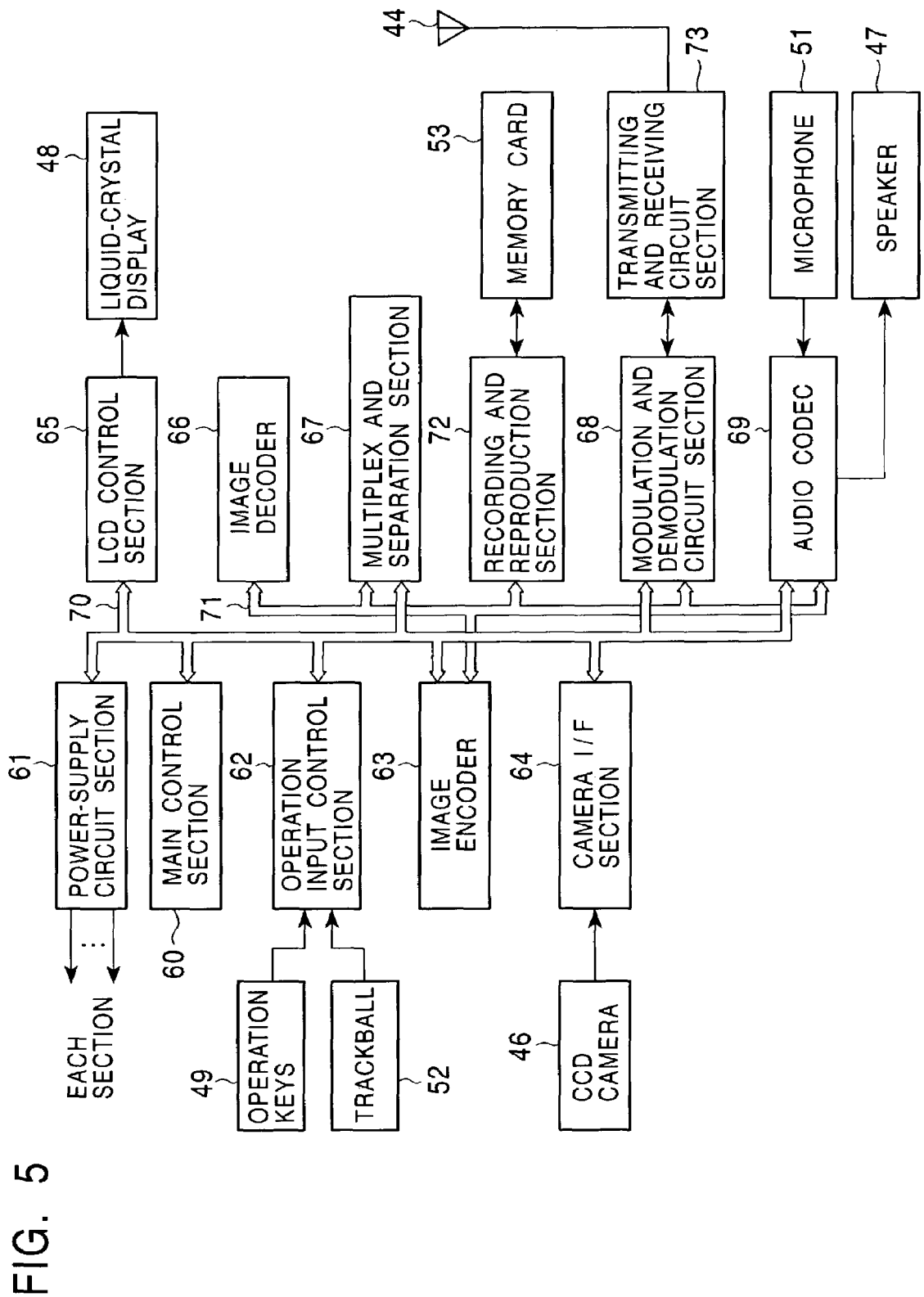
FIG. 5 is a block diagram showing an example electrical structure of the portable telephone shown in FIG. 1.

FIG. 5 shows an example electric structure of the portable telephone 2 shown in FIG. 1.

The portable telephone 2 is formed such that a power-supply circuit section 61, an operation input control section 62, an image encoder 63, a camera I/F (interface) section 64, an LCD control section 65, an image decoder 66, a multiplex and separation section 67, a recording and reproduction section 72, a modulation and demodulation circuit section 68, and an audio codec 69 are connected to each other through a main bus 70 to a main control section 60 which entirely controls the display section 42 and each section of the body 43, and the image encoder 63, the image decoder 66, the multiplex and separation section 67, the modulation and demodulation circuit section 68, and the audio codec 69 are connected to each other through a synchronization bus 71.

When a call is finished or a power supply key is turned on by a user operation, the power-supply circuit section 61 supplies electric power from the battery pack to each circuit section to make the portable telephone ready for operation.

The main control section 60 is formed of a CPU, a ROM, a RAM, and others not shown, and the CPU executes a program stored in the ROM to perform various types of processing.

More specifically, in the portable telephone 2, the audio codec 69 converts an audio signal caught by the microphone 51 during a voice call mode into digital audio data, and the modulation and demodulation circuit section 68 applies spectrum spreading processing to the digital audio data under the control of the main control section 60. Further, in the portable telephone 2, a transmitting and receiving circuit section 73 applies digital-analog conversion processing and frequency conversion processing to a signal obtained after the spectrum spreading processing, and sends through an antenna 44.

In the portable telephone 2, the transmitting and receiving circuit section 73 applies amplification, frequency conversion processing, and analog-digital conversion processing to a received signal received by the antenna 44 during the voice call mode, and then the signal is sent to the modulation and demodulation circuit section 68. The modulation and demodulation circuit section 68 applies inverse spectrum spreading processing to the signal sent from the transmitting and receiving circuit section 73, and sends it to the audio codec 69. The audio codec 69 converts the signal sent from the modulation and demodulation circuit section 68 into an analog audio signal and sends it to speaker 47 for output.

Further, in the portable telephone 2, when text data such as electronic mail is transmitted, for example, text data input by an operation of an operation key 49 and the trackball 52 is sent to the main control section 60 through the operation input control section 62. The main control section 60 makes the modulation and demodulation circuit section 68 and the transmitting and receiving circuit section 73 process the received text data, and send through the antenna 44 to the base station 3, in the same way as for the voice call described above.

In the portable telephone 2, when text data such as electronic mail is received, a received signal received from the base station 3 through the antenna 44 is processed by the transmitting and receiving circuit section 73 and the modulation and demodulation circuit 68 to be restored to text data, and sent to the liquid-crystal display 48 through the LCD control section 65 to display as electronic mail.

Further, in the portable telephone 2, when image data is transmitted, for example, image data captured by the CCD camera 46 is sent to the image encoder 63 through the camera interface section 64. The image encoder 63 compresses and encodes the image data sent from the CCD camera 46 according to a predetermined encoding method to convert to encoded image data, and sends it to the multiplex and separation section 67. At the same time, in the portable telephone 2, voice caught by the microphone 51 during the image capture performed by the CCD camera 46 is sent to the multiplex and separation section 67 through the audio codec 69 as digital audio data. The multiplex and separation section 67 multiplexes the encoded image data sent from the image encoder 63 and the audio data sent from the audio codec 69 according to a predetermined method. Multiplexed data obtained as a result is processed by the modulation and demodulation circuit section 68 and the transmitting and receiving circuit section 73, and sent through the antenna 44.

At the same time, the image data captured by the CCD camera 46 can be sent through the camera interface section 64 and the LCD control section 65 to the liquid-crystal display 48 and displayed.

In the portable telephone 2, when image data is received, for example, a received signal received from the base station 3 through the antenna 44 is processed by the transmitting and receiving circuit section 73 and the modulation and demodulation circuit section 68, and multiplexed data obtained as a result is sent to the multiplex and separation section 67. The multiplex and separation section 67 separates the multiplexed data into encoded image data and audio data, sends through the synchronization bus 61 the encoded image data to the image decoder 66 and the audio data to the audio codec 69. The image decoder 66 decodes the encoded image data according to a decoding method corresponding to the predetermined encoding method to generate reproduction moving-image data, and sends it through the LCD control section 65 to the liquid-crystal display 48 to display it. The audio codec 69 converts the received audio data to an analog audio signal, and sends it to the speaker 47 to output it.

In the portable telephone 2, various received data can be sent to the memory card 53 through the recording and reproduction section 72 and recorded therein.

Figure 6:
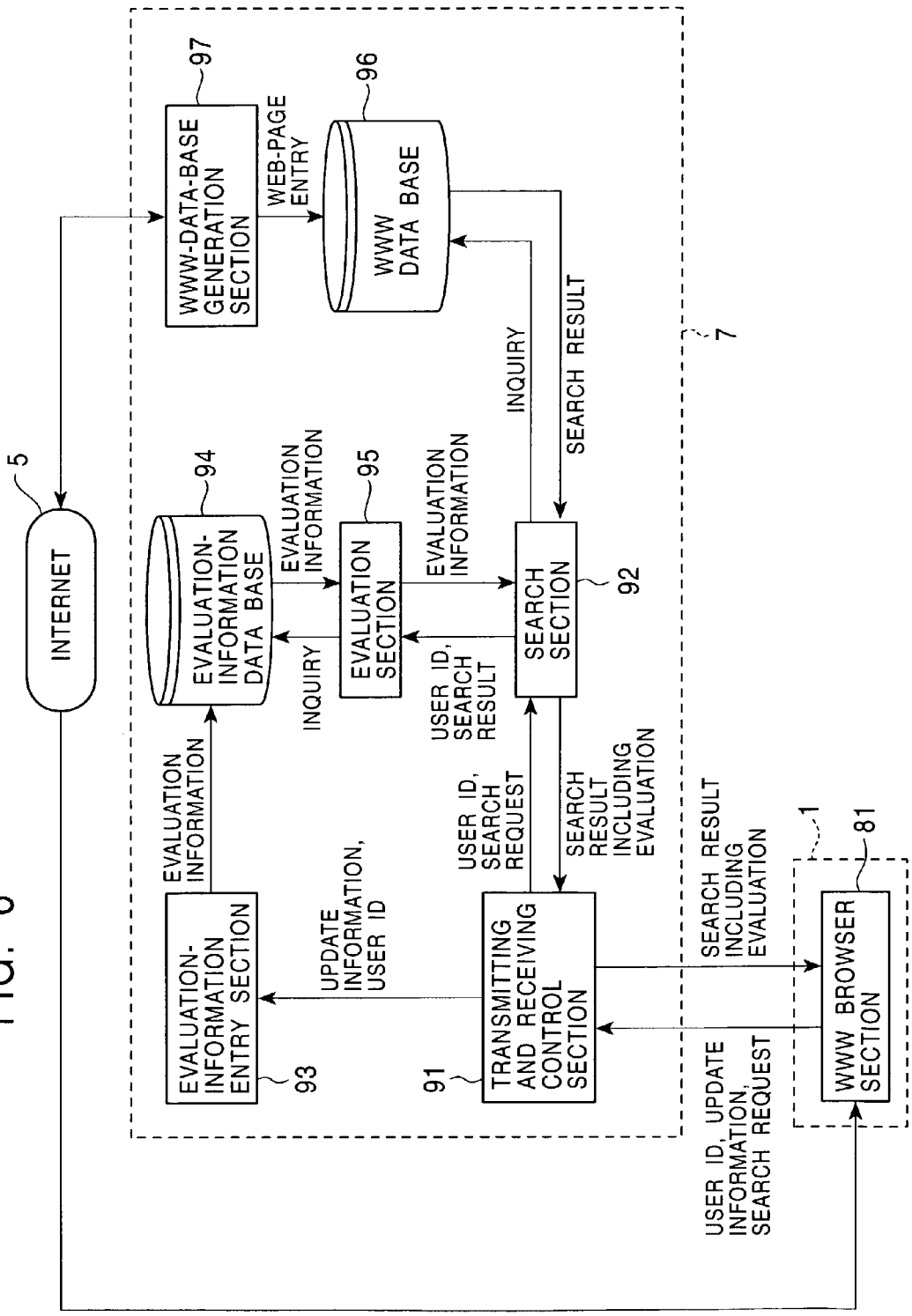
FIG. 6 is a block diagram showing an example functional structure of the network system shown in FIG. 1.

FIG. 6 is a block diagram showing an example functional structure of the personal computer 1 and the evaluation and search server 7. This functional structure is implemented when the CPU 21 executes a WWW browser program stored in the storage section 28 of the personal computer 1, and a CPU not shown executes a search program held by the evaluation and search server 7. In this example, a case in which the user executes the WWW browser program for the personal computer 1 will be described. A similar functional structure is also implemented when the user executes a WWW browser program stored in the main control section 60 of the portable telephone 2.

A WWW browser section 81 in the personal computer 1 sends search request information formed of information, such as a web-page keyword input by the user, to the evaluation and search server 7. The WWW browser section 81 displays search result information, such as the URLs of web pages, sent from the evaluation and search server 7 as a result of the search on the output section 72 formed of a CRT and others in a list form to provide the user with the information. Evaluation information for the content of each web page, evaluated by the evaluation and search server 7, is added to the web page and provided for the user. Therefore, the user can select only a useful web page and browse it according to the evaluation information.

When the user operates the input section formed of a mouse and others to select a desired web page from the list information of web pages provided as a result of the search, the WWW browser section 81 accesses the WWW server 8 specified by the URL of the selected web page, connected to the Internet 5, and obtains the HTML file of the web page. When the WWW browser section 81 obtains the HTML file, the WWW browser section 81 displays the file on or outputs the file to the output section 27.

The WWW browser section 81 also generates from various types of operation information obtained when the user operates the input section 26 to input for the web page displayed on the output section 27, evaluation-value update information serving as viewing-action information for the web page, and sends the information to a transmitting and receiving control section 91 of the evaluation and search server 7. For example, according to a period for which the user displays a certain web page, the WWW browser 81 generates update information for the evaluation value of the web page, and sends the information to the transmitting and receiving control section 91. Specifically, evaluation-value update information which indicates that a more valuable web page is generated for a web page displayed for a longer period. In contrast, evaluation-value update information which indicates that a less valuable web page is generated for a web page for which, at an instant when the web page is displayed, a jump to another web page is specified. Update information sent to the transmitting- and receiving control section 91 includes evaluation-value update information corresponding to the content of an operation input by the user for the web page, and the URL of the web page.

FIG. 7 is a view showing example relationships between the contents of operations and evaluation-value update information.

In this example, it is indicated that "glanced and then jumped to the next page" is set as a first operation content, and when the user performs such an operation, the evaluation value of the web page is reduced by 10 points. In other words, when the user displays a web page for only an instant, and then jumps to another page, update information indicating that the evaluation value of the web page displayed only for an instant is to be reduced by 10 points, and the URL of that web page are reported to the evaluation and search server 7. When the evaluation and search server 7 receives the report, if evaluation information for the web page displayed only for an instant, specified by the URL, has already been input, the evaluation and search server 7 reduces its evaluation value by 10 points. If evaluation information for the web page has not yet been input, the evaluation and search server 7 reduces an initial value specified in advance by 10 points and inputs the value.

Further, in FIG. 7, it is indicated that "entered into a bookmark" is set as a second operation content, and when the user inputs a web page into a bookmark, the evaluation value of the web page is increased by 10 points. In the same way, it is specified that, when the user prints or saves a web page being displayed, the evaluation value of the web page is increased by 8 points, and when various operations are input frequently for a web page, the evaluation value of the web page is increased by 7 points. Further, it is specified that, when the user displays a web page for a predetermined period or more, the evaluation value of the web page is increased by 5 points, and when the user browses a web page many times within a fixed period, the evaluation value of the web page is increased by 3 points.

Update information serving as viewing-action information can be generated from various operations in addition to the operations shown in FIG. 7. For example, update information may be generated from the operation state of a mouse on the web page being displayed, the scroll distance of a web page, the number of accesses to other linked web pages, and others, and sent to the evaluation and search server 7. The operation state of a mouse refers, for example, to the movement distance of the mouse, and the number of times the mouse is clicked. In addition, the operation state of a mouse includes the number of times downloading of contents which link to the web page being displayed is specified, and the number of times uploading of contents which link to a web page being displayed is specified.

In the above description, the WWW browser section 81 transmits evaluation-value update information. Information indicating an operation content input by the user and the URL of the web page being displayed may be transmitted to the transmitting and receiving control section 91. In this case, a table indicating relationships between operation contents and evaluation values, such as that shown in FIG. 7, is, for example, stored in advance in an evaluation-information entry section 93, and the evaluation-information entry section 93 generates evaluation-value update information.

The transmitting and receiving control section 91 of the evaluation and search server 7 controls transmitting and receiving of various types of information to and from the WWW browser section 81, and sends information obtained from the WWW browser section 81 to each section of the evaluation and search server 7. When the transmitting and receiving control section 91 receives a web-page keyword as search request information from the WWW browser section 81, the transmitting and receiving control section 91 sends the search request information to a search section 92. Reversely, when the transmitting and receiving control section 91 receives search result information including evaluation corresponding to the search request information from the search section 92, the transmitting and receiving control section 91 sends the search result information including evaluation to the WWW browser section 81. Information transmission and receiving between the WWW browser section 81 and the transmitting and receiving control section 91 are actually executed through the public-line network 4, the Internet 5, and the access server 6, as shown in FIG. 1.

The transmitting and receiving section 91 sends evaluation-value update information sent from the WWW browser section 81 and a user ID to the evaluation-information entry section 93.

The search section 92 searches web pages which have been input to a WWW data base 96, according to a web-page keyword included in search request information sent from the transmitting and receiving control section 91. When a web page corresponding to the keyword is found, the search section 92 obtains the URL of the web page as a search result.

When the search section 92 obtains the URL as a search result, it sends the user ID, which is the identification information of the WWW browser section 81, sent from the transmitting and receiving control section 91 and the URL obtained as a search result to an evaluation section 95. The evaluation section 95 calculates the evaluation value of each web page according to the received information, and sends the evaluation value to the search section 92.

Further, when the search section 92 receives a notice of the evaluation value of each web page from the evaluation section 95, the search section 92 generates search result information including evaluation, from the evaluation value and the URL obtained as a search result, and sends it to the transmitting and receiving control section 91.

The evaluation-information entry section 93 updates evaluation information which has been input into an evaluation-information data base 94, according to update information generated by the WWW browser section 81 and sent from the transmitting and receiving control section 91.

The evaluation-information data base 94 stores a list (hereinafter called a high-evaluation list, if necessary) of web pages which the user of the personal computer 1 sets high evaluations on, correspondingly to the user ID. The high-evaluation list stores a predetermined number of web pages in the descending order of their evaluation values.

The evaluation section 95 obtains a high-evaluation list stored in the evaluation-information data base 94, corresponding to the user ID sent from the search section 92, calculates the evaluation value of the web page sent as a search result, and sends the evaluation value to the search section 92.

A WWW-data-base generation section 97 serves, for example, as a directory-type search engine, classifies the contents of web pages stored in a number of WWW servers 8 connected to the Internet 5 into categories, and inputs the URLs of the web pages into the WWW data base 96. In other words, the WWW-data-base generation section 97 generates the WWW data base 96 such that a web page can be searched for according a keyword input by the user.

Figure 8:
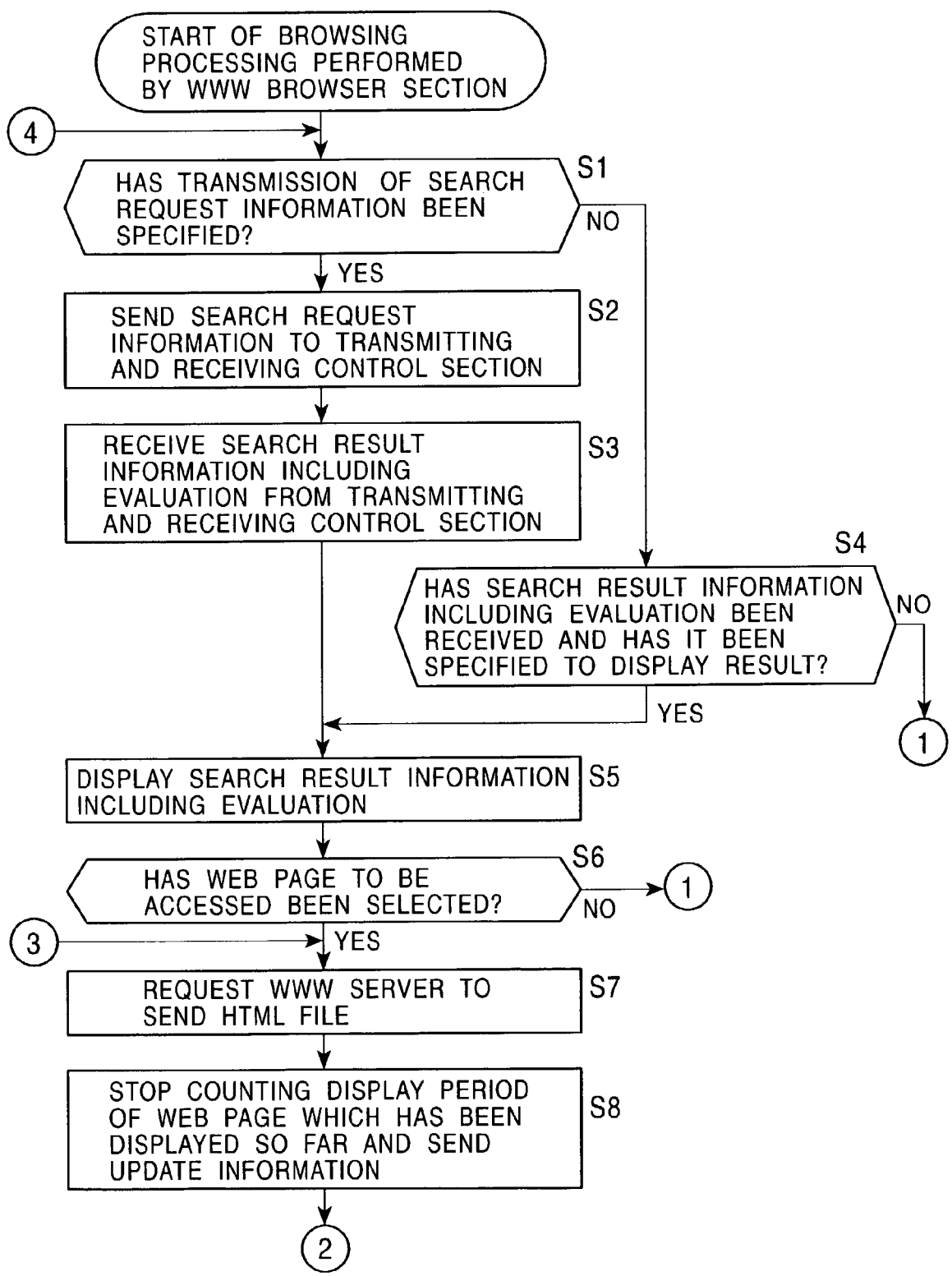
FIG. 8 is a flowchart describing the processing of a WWW browser section shown in FIG. 6.
Figure 9:
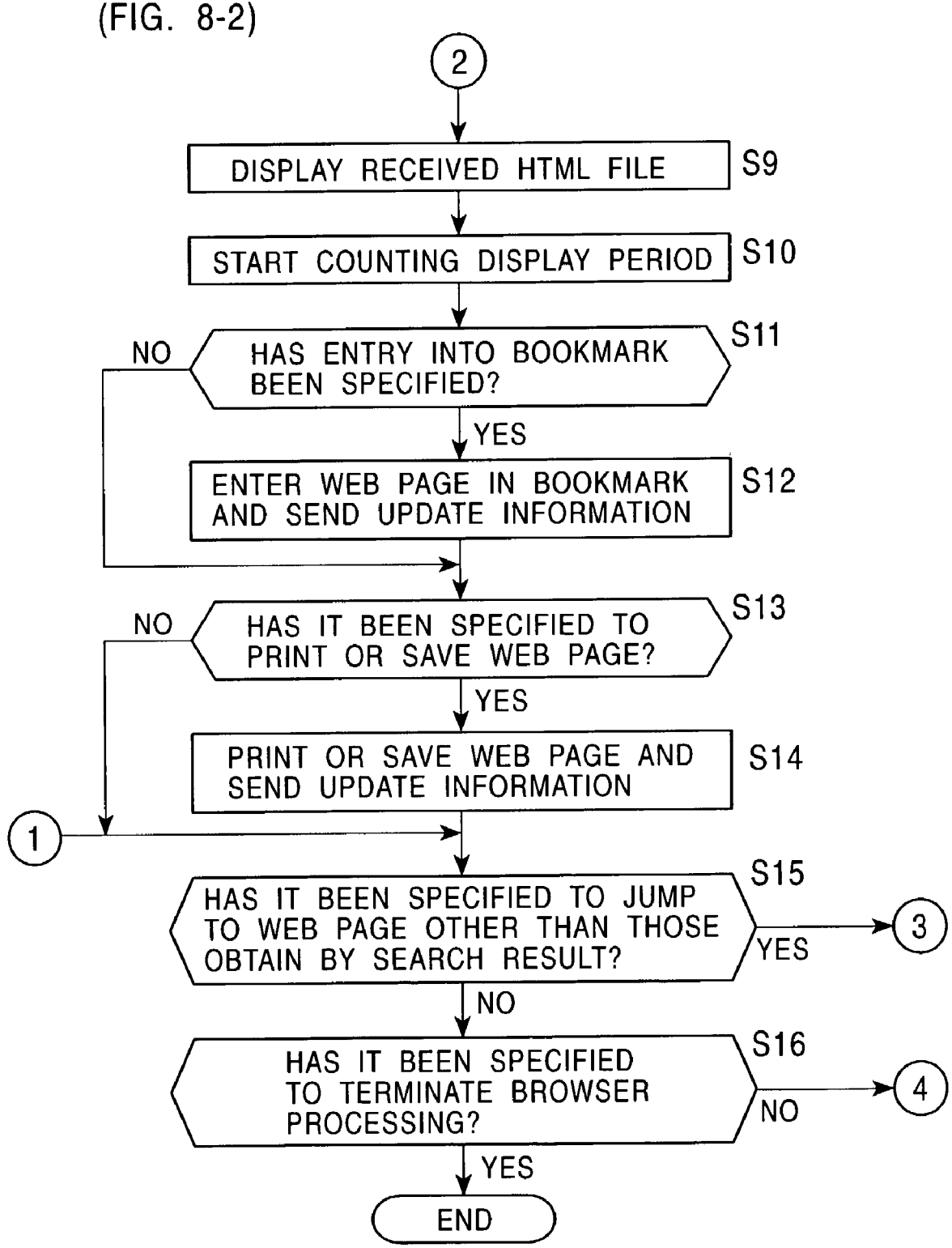
FIG. 9 is a flowchart following FIG. 8, describing the processing of the WWW browser section shown in FIG. 6.

The operation of each section shown in FIG. 6 will be described next. By referring to flowcharts shown in FIG. 8 and FIG. 9, browser processing performed by the WWW browser section 81 will be described first.

In step S1, the WWW browser section 81 determines whether the user has specified transmission of search request information which includes a web-page keyword. When it is determined that the transmission has been specified, the processing proceeds to step S2, and the WWW browser section 81 sends the search request information to the transmitting and receiving control section 91 of the evaluation and search server 7.

In step S3, the WWW browser section 81 receives search result information including evaluation sent by the evaluation and search server 7 in response to the sent search request information. In step S5, the WWW browser section 81 displays the search result information including evaluation on the output section 27 formed of a CRT and others. The output section 27 displays a list of web-page URLs as a search result corresponding to the keyword input by the user, and also displays an evaluation value for the content (quality) of each web page. The indication of the evaluation value for each web page is not limited to a numeral. It can be indicated, for example, by a bar chart or the number of asterisks.

In contrast, when it is determined in step S1 that the transmission of search request information has not been specified, the processing proceeds to step S4. In step S4, the WWW browser section 81 determines whether search result information including evaluation has been already received and displaying the result has been specified. When it is determined that displaying the result has been specified, the processing proceeds to step S5, and the WWW browser section 81 outputs the result to the output section 27. When the WWW browser section 81 determines that it has not received search result information including evaluation, or that displaying obtained search result information including evaluation has not been specified, the processing proceeds to step S15.

In step S6, the WWW browser section 81 determines whether a web page to be accessed has been selected from the search result information including evaluation, displayed on the output section 27. When it is determined that a web page to be accessed has been selected, the processing proceeds to step S7.

In step S7, the WWW browser section 81 accesses the WWW server 8 specified by the URL of the selected web page, and requests the HTML file indicating the web page to be transmitted. At timing when jumping from the web page currently being displayed to another web page is specified, the WWW browser section 81 stops counting a display period for the web page which has been displayed so far, and updates the evaluation value (when a web page is displayed, the WWW browser section 81 starts counting a display period in step S10, described below) in step S8.

In step S8, the WWW browser section 81 stops counting the display time for the web page, generates update information for increasing the evaluation value of the web page by 5 points as described by referring to FIG. 7, for example, in a case in which the web page has been displayed for a predetermined period or more, and sends the update information to the evaluation and search server 7 to update the evaluation value of the web page.

The web page sent from the WWW server 8 in response to the process in step S7 is displayed on the output section 27 in step S9, and counting the display period of the web page is started in step S10.

In step S11, the WWW browser section 81 determines whether the user has specified that the web page being displayed be input into a bookmark (favorite entry). When it is determined that the user has specified; the proceeding proceeds to step S12, the web page is input into a bookmark, and evaluation-value update information corresponding to the entry in the bookmark is generated and sent to the transmitting and receiving control section 91. The WWW browser section 81 generates update information, for example, for increasing the evaluation value of the web page by 10 points according to a bookmark entry, as shown in FIG. 7, and sends it to the transmitting and receiving control section 91.

In contrast, when it is determined in step S11 that an entry in a bookmark has not been specified, the processing skips the process of step S12 and proceeds to step S13.

In step S13, the WWW browser section 81 determines whether the user has specified that the web page being displayed be printed or saved. When it is determined that the user has specified, printing or save processing is executed and evaluation-value update information corresponding to the processing is generated and sent to the transmitting and receiving control section 91. When the user has specified that a web page be printed or saved, update information indicating, for example, that the evaluation value of the web page is increased by 8 points, as shown in FIG. 7, is generated and sent to the evaluation and search server 7.

In contrast, when it is determined in step S13 that the user has not specified that the web page be printed or saved, the processing skips the process of step S14, and the process of step S15 is executed.

In step S15, the WWW browser section 81 determines whether a jump to a web page other than the web pages displayed in step S5 as a result of keyword search has been specified. When the user operates the input section 26 to input a URL in a predetermined input column, for example, it is determined that a jump to a web page other than those obtained as the search result has been specified, the processing returns to the process of step S7, and subsequent processes are repeated.

When the WWW browser section 81 determines in step S15 that a jump to a web page other than those obtained as a search result has not been specified, according to a user's input, the processing proceeds to step S16. It is determined in step S16 whether the end of the browser processing has been specified. When it is determined that the end of the browser processing has not been specified, the processing proceeds to step S1, and subsequent processes are repeatedly executed. In contrast, when it is determined in step S16 that the end of the browsing processing has been specified, the processing is terminated.

Figure 10:
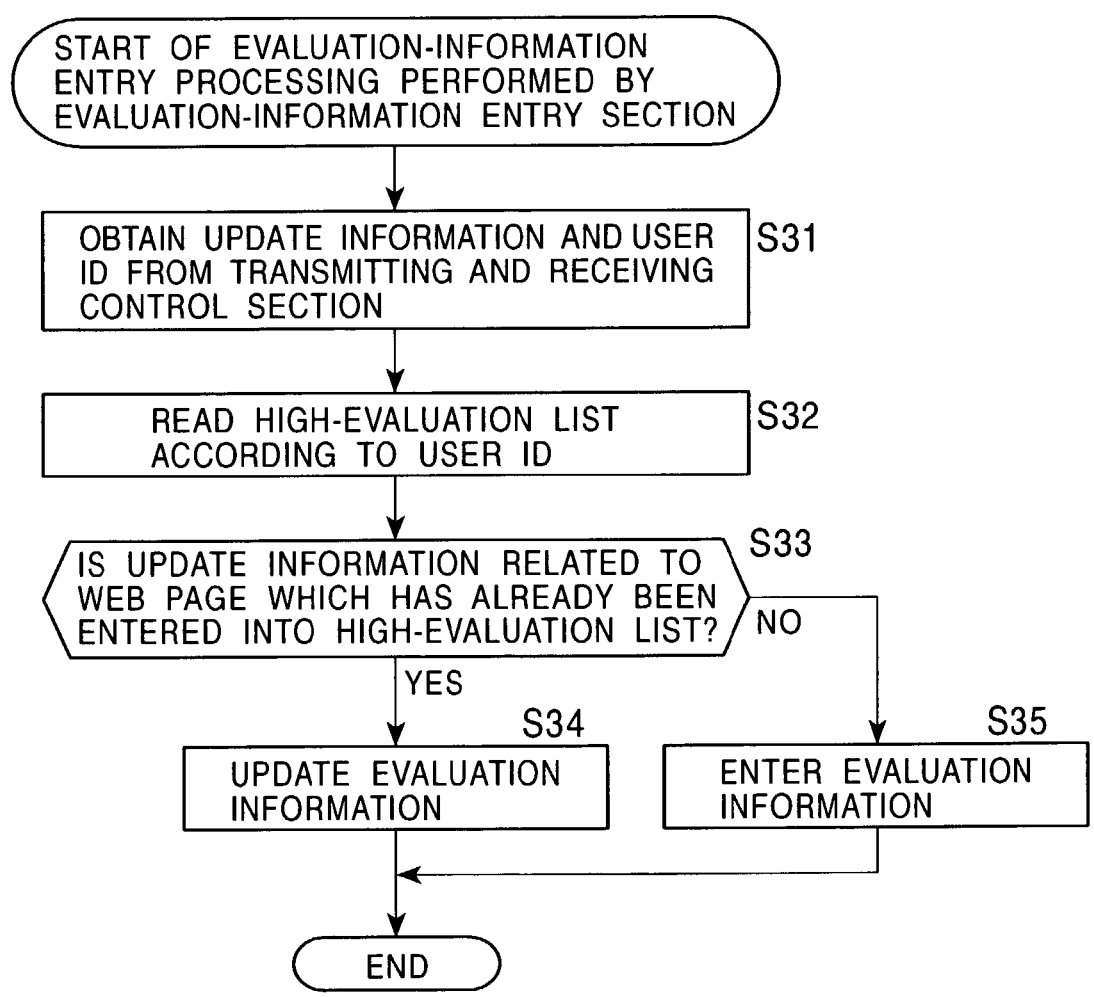
FIG. 10 is a flowchart describing the processing of an evaluation-information entry section shown in FIG. 6.

Evaluation-information entry processing executed by the evaluation-information entry section 93 of the evaluation and search server 7 will be described by referring to a flowchart shown in FIG. 10.

In step S31, the evaluation-information entry section 93 receives evaluation-value update information and the user ID with which the WWW browser section 81, which generated the update information, is identified, sent from the transmitting and receiving control section 91.

In step S32, the evaluation-information entry section 93 reads a high-evaluation list entered into the evaluation-information data base 94, according to the received user ID. In step S33, it is determined whether the web page for which the evaluation value is to be updated by the update information has been already entered into the high-evaluation list of the user.

When it is determined in step S33 that the received update information is that used for updating the evaluation value of a web page which has been already entered, the processing proceeds to step S34, and the evaluation information entered into the evaluation-information data base 94 is updated. When the transmitting and receiving control section 91 sends update information indicating that the evaluation value of a "web page A" is reduced by 10 points, and the evaluation value of the "web page A" has already been entered into the high-evaluation list of the evaluation-information data base 94 as 80 points, for example, the evaluation-information entry section 93 sets the evaluation value of the "web page A" to 70 points to update it in the evaluation-information data base 94.

In contrast, when the evaluation-information entry section 93 determines in step S33 that the received update information is that related to a web page which has not yet been entered into the high-evaluation list, the processing proceeds to step S35, and the received update information is newly entered into the evaluation-information data base 94. When the transmitting and receiving control section 91 sends update information indicating that the evaluation value of the "web page A" is increased by 10 points, and it has been specified in advance that the initial value of a web page which has not yet been entered be set to 50 points, for example, the evaluation-information entry section 93 sets the evaluation value of the "web page A" to 60 points and enters it into the evaluation-information data base 94.

The above-described processing is repeatedly executed every time when update information is received to store the high-evaluation lists of a plurality of users in the evaluation-information data base 94.

Evaluation-value calculation processing performed by the evaluation section 95 of the evaluation and search server 7 will be described next by referring to a flowchart shown in FIG. 11.

In step S41, the evaluation section 95 obtains the user ID sent from the search section 92, and a web-page search result obtained when the search section 92 searches the WWW data base 96 according to a keyword sent from the user.

In step S42, the evaluation section 95 sets the user specified by the user ID to a user (hereinafter called a focused-on user, if necessary) on which an attention is focused, and obtains the high-evaluation list of web pages for the focused-on user from the evaluation-information data base 94. In step S43, the evaluation section 95 also obtains a predetermined number of high-evaluation lists for users other than the focused-on user, from the evaluation-information data base 94.

In step S44, the evaluation section 95 extracts the degree of preference match between the focused-on user and the other users from the obtained high-evaluation lists. The evaluation section 95 executes, for example, a process shown in FIG. 12 to extract the degree of preference match.

FIG. 12(A) indicates an example high-evaluation list of a user A, a focused-on user, and FIG. 12(B) is a view showing an example high-evaluation list of a user B.

In this example, as shown in FIG. 12(A), "URL1" is the URL of a web page which has the highest evaluation value of the user A, "URL2" is the URL of a web page which has the second highest evaluation value of the user A, "URL3" is the URL of a web page which has the third highest evaluation value of the user A, and "URL4" is the URL of a web page which has the fourth highest evaluation value of the user A. The evaluation value of the web page specified by "URL1" is set to 100 points, the evaluation value of the web page specified by "URL2" is also set to 100 points, the evaluation value of the web page specified by "URL3" is set to 98 points, and the evaluation value of the web page specified by "URL4" is set to 95 points.

In FIG. 12(B), "URL2" is the URL of a web page which has the highest evaluation value of the user B and its evaluation value is set to 98 points, "URL3" is the URL of a. web page which has the second highest evaluation value of the user B and its evaluation value is set to 97 points. "URL20" is the URL of a web page which has the third highest evaluation value of the user B and its evaluation value is set to 95 points, and "URL1" is the URL of a web page which has the fourth highest evaluation value of the user B and its evaluation value is set to 93 points.

The high-evaluation list of each user includes, for example, up to a web page having the 100th highest evaluation value.

In step S44, the evaluation section 95 calculates the number of web pages entered into each high-evaluation list in common, and extracts a degree of preference match corresponding to the number.

FIG. 13 is a view showing an example degree of preference match, set correspondingly to the number of web pages entered in common. In this example, when the number of web pages entered in common is 10 or more, the degree of preference match is set to a 1.0 point. When the number of web pages entered in common is nine, the degree of preference match is set to 0.9 points. In the same way, the degree of preference match is reduced by 0.1 points as the number of web pages entered in common is reduced by one.

When the evaluation section 95 calculates the number of web pages entered in common from the high-evaluation lists shown in FIG. 12(A) and FIG. 12(B) and obtains eight as a result, the degree of preference match between the user A and the user B is extracted as 0.8 and set. The evaluation section 95 extracts the degree of preference match between the focused-on user and another user in step S44 by such a method.

According to the degree of preference match extracted in step S44, the evaluation section 95 weights the evaluation values of the web page (web page reported from the search section 92) searched for to calculate the evaluation value of the web page.

Figure 14:
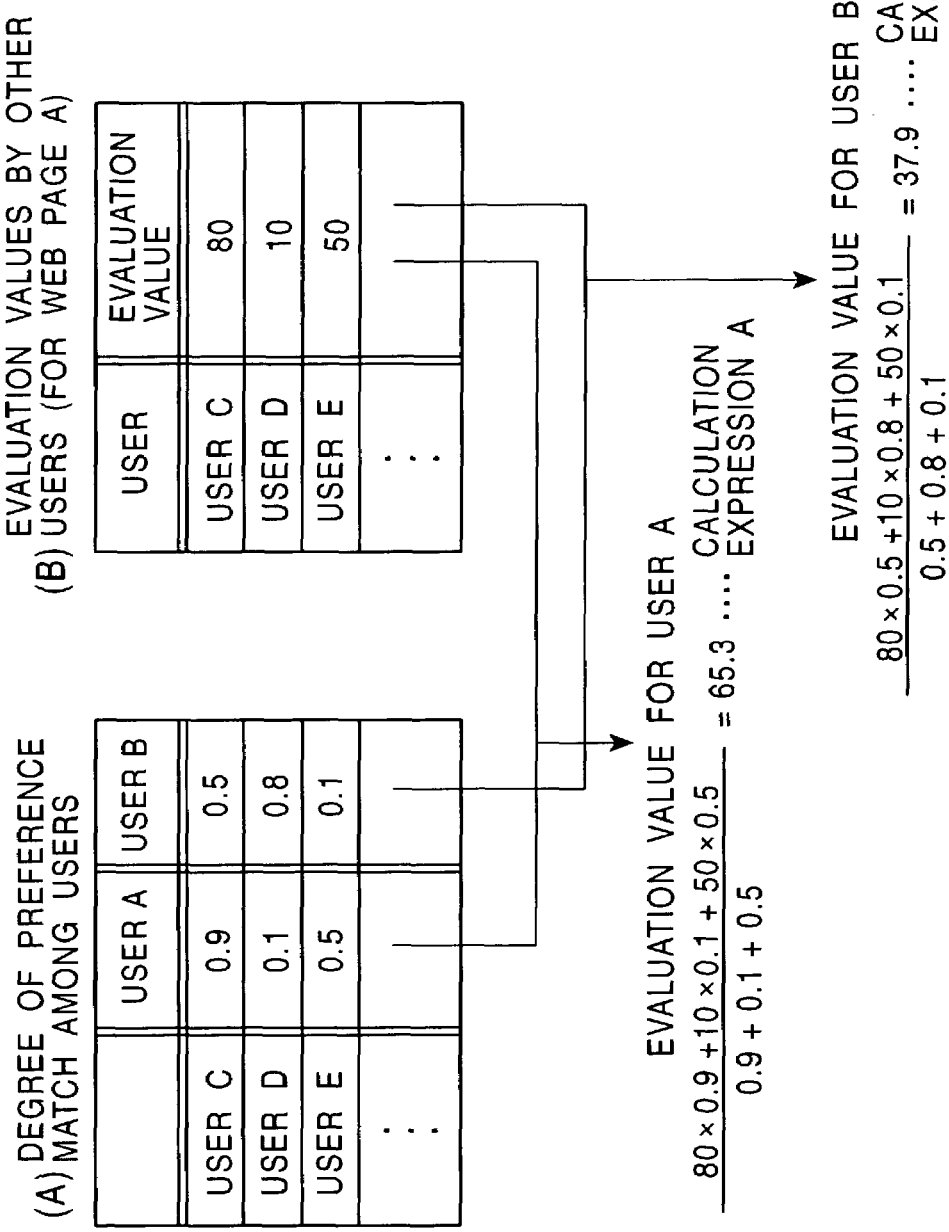
FIG. 14 is a view showing a method for calculating evaluation values.

FIG. 14 is a view showing an example calculation method of an evaluation value, executed by the evaluation section 95.

In FIG. 14, FIG. 14(A) indicates an example degree of preference match among users, and FIG. 14(B) indicates an example evaluation value of each user for the "web page A" serving as a web page included in the search result sent from the search section 92.

In FIG. 14(A), the degree of preference match between the user A, who is a focused-on user, and a user C is set to 0.9 points, the degree of preference match between the user A and a user D is set to 0.1 points, and the degree of preference match between the user A and a user E is set to 0.5 points. In addition, the degree of preference match between the user B and the user C is set to 0.5 points, the degree of preference match between the user B and the user D is set to 0.8 points, and the degree of preference match between the user B and the user E is set to 0.1 points.

In FIG. 14(B), the evaluation value of the user C for the "web page A" is set to 80 points, the evaluation value of the user D for the "web page A" is set to 10 points, and the evaluation value of the user E for the "web page A" is set to 50 points.

The evaluation section 95 calculates the evaluation value of each web page reported in the search result, according to relationship tables such as those shown in FIG. 14(A) and FIG. 14(B) to generate search result information including evaluation, and provides it for the focused-on user (WWW browser section 81).

In FIG. 14, for example, the evaluation value of the user A, the focused-on user, for the "web page A" is calculated by an calculation expression A. Specifically, the evaluation values of other users, such as those shown in FIG. 14(B), are multiplied (weighted) by the degrees of preference match with the users, the products are added, and the sum is divided by the total of the degrees of preference match between the focused-on user and the other users to obtain 65.3 points.

When the user B is set to a focused-on user, an evaluation value for the "web page A" is calculated by a calculation expression B and 37.9 points are obtained. As shown in FIG. 14, an evaluation value for an identical web page differs depending on which user is set to a focused-on user.

In step S46, the evaluation section 95 sends the evaluation value of each web page calculated in step S45 to the search section 92. The search section 92 associates the evaluation values sent from the evaluation section 95 to the search-result web pages to generate search result information including evaluation, and provides it for the WWW browser section 81. A method for calculating an evaluation value for a web page is not limited to that shown in FIG. 14. Various methods can be used to calculate it. For example, an evaluation value for a predetermined web page may be calculated from the average of the evaluation values of a plurality of users.

Figure 15:
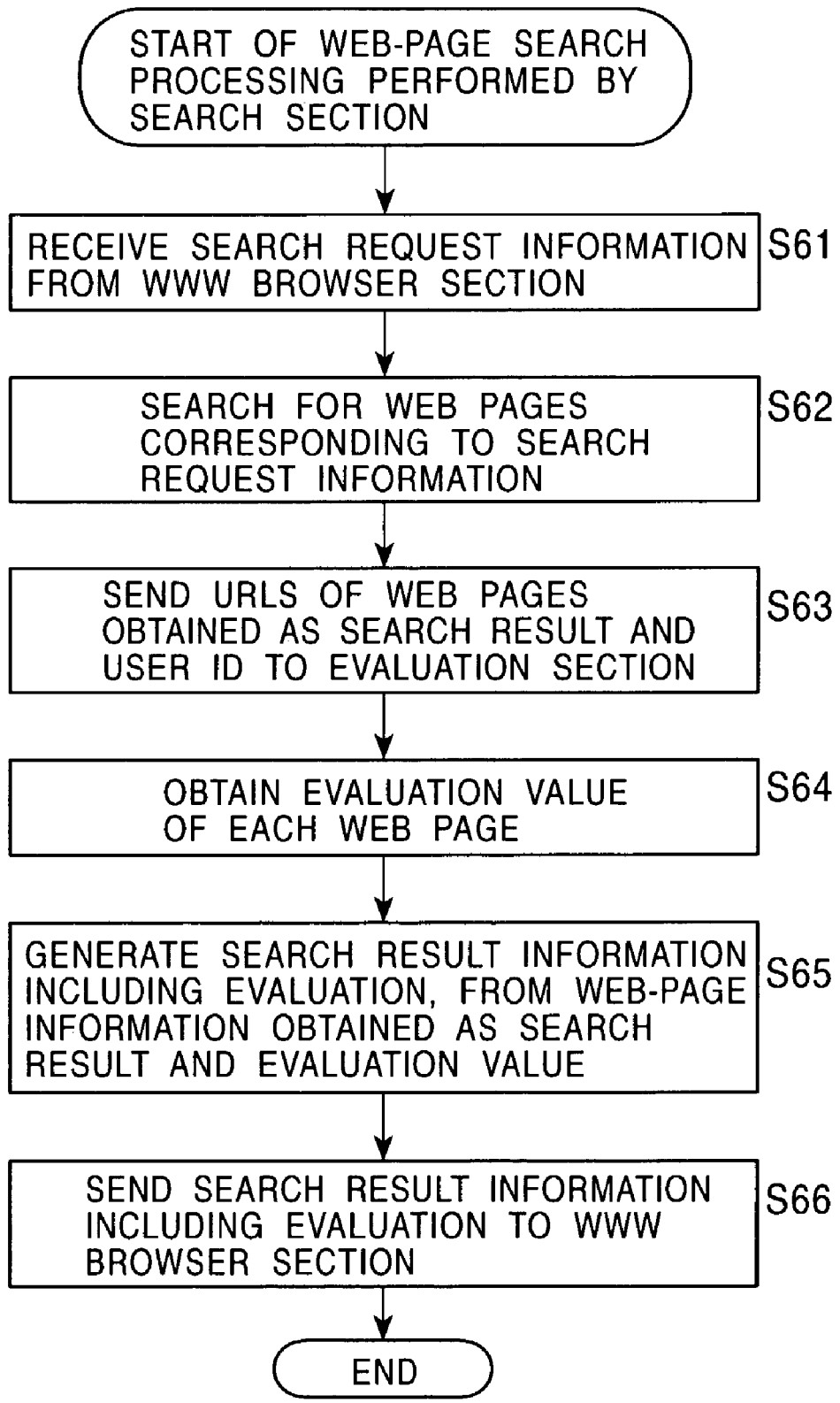
FIG. 15 is a flowchart describing the processing of a search section shown in FIG. 6.

Web-page search processing performed by the search section 92 will be described next by referring to a flowchart shown in FIG. 15.

In step S61, the search section 92 receives search request information sent from the WWW browser section 81 through the transmitting and receiving control section 91. The search request information includes a keyword of the web page to be searched for.

In step S62, the search section 92 searches web pages entered into the WWW data base 96 for a web page corresponding to the received keyword. Then, in step S63, the search section 92 reports the URL of the web page searched for and the user ID to the evaluation section 95.

Figure 11:
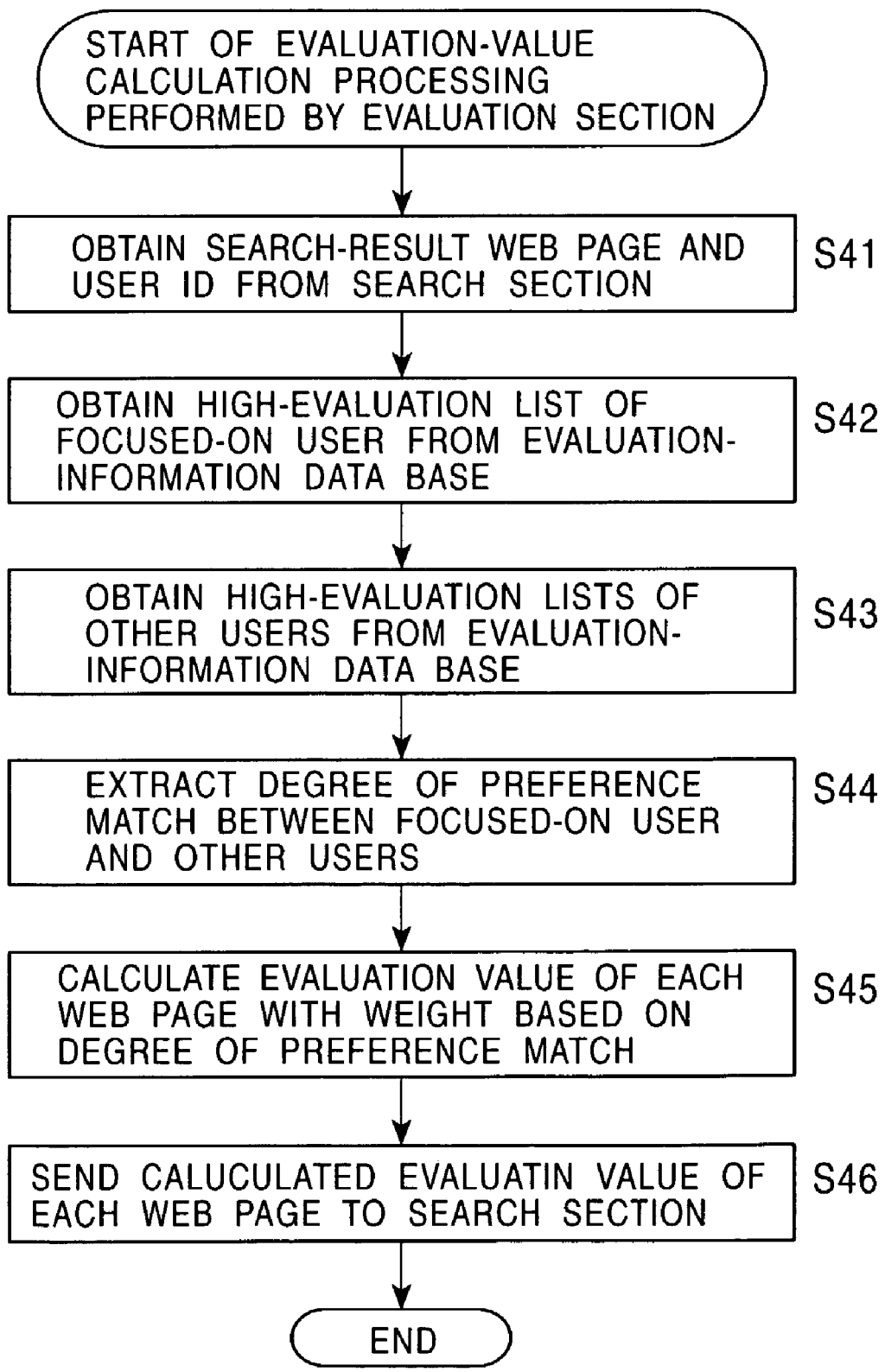
FIG. 11 is a flowchart describing the processing of an evaluation section shown in FIG. 6.

When the evaluation section 95 receives the report, it executes the processing shown in the flowchart of FIG. 11, described above, to provide the evaluation value of each web page for the search section 92. The evaluation value of each web page provided for the search section 92 is taken in step S64. In step S65, the evaluation value sent from the evaluation section 95 is added for each search-result web page to generate search result information including evaluation.

In step S66, the search section 92 sends the search result information including evaluation, generated in step S65 to the WWW browser section 81 through the transmitting and receiving control section 91.

With these operations, the user of the personal computer 1 can use the search result of a web page corresponding to the user's preference and the evaluation information of each web page to easily access a useful (high-quality) web page.

Figure 16:
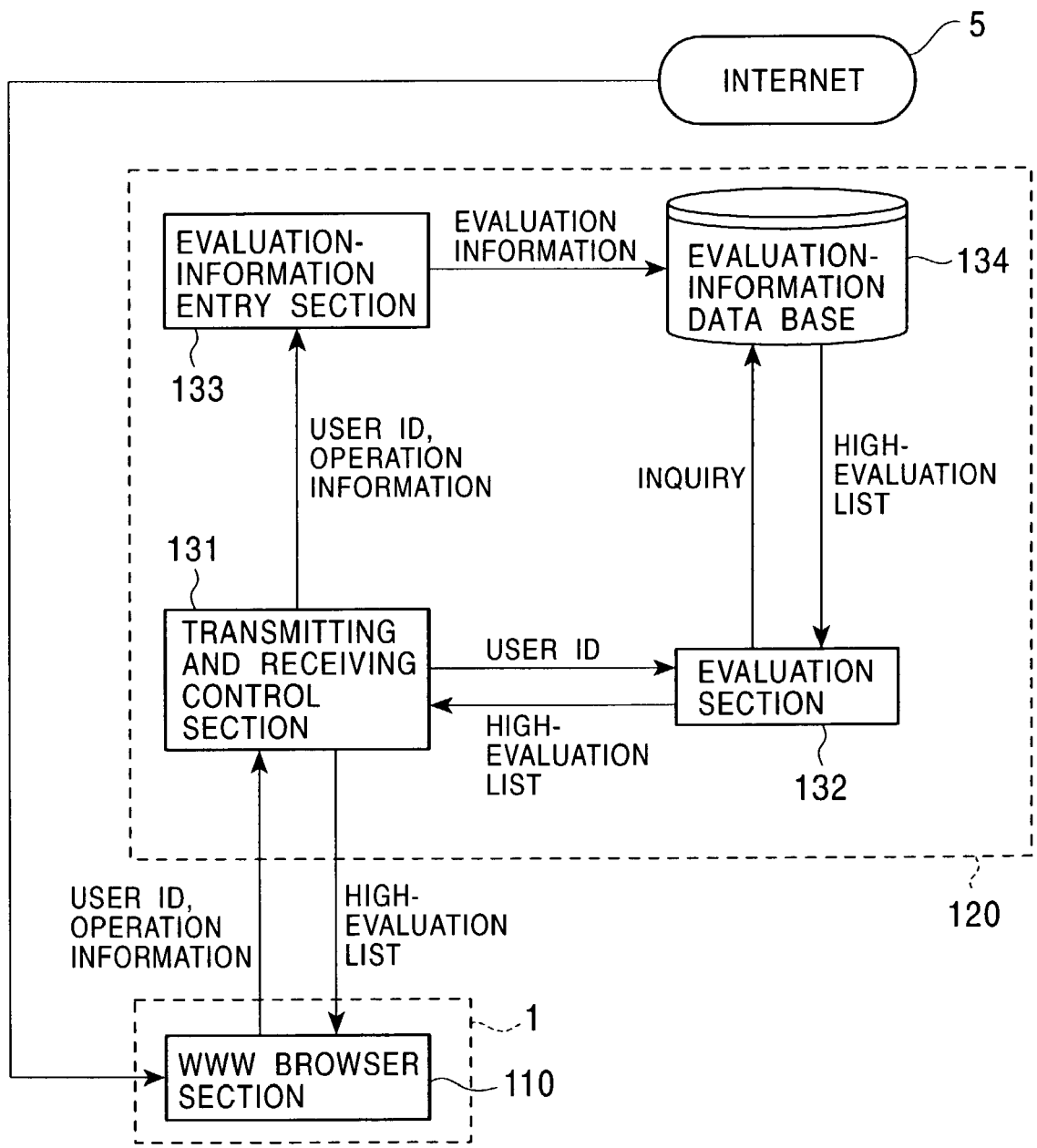
FIG. 16 is a block diagram showing an example functional structure of another network system to which the present invention is applied.

FIG. 16 is a view showing an example functional structure of another network system to which the present invention is applied. In the example shown in FIG. 16, an evaluation server 120 is different from the evaluation and search server 7 described above, has no web-page search function, generates a high-evaluation list according to operation information sent from a WWW browser section 110, and provides it for the user. In the network system shown in FIG. 6, the WWW browser section 81 generates evaluation value update information for a web page and sends the information to the evaluation and search server 7. In the network system shown in FIG. 16, a WWW browser section 110 sends only operation information input by the user for a web page, and requests the evaluation server 120 to update the evaluation value. Specifically, a relationship table between operation contents and evaluation-value update information, such as that shown in FIG. 7, is stored in an evaluation-information entry section 133 of the evaluation server 120, and the evaluation-information entry section 133 generates evaluation-value update information from the operation contents.

Figure 17:
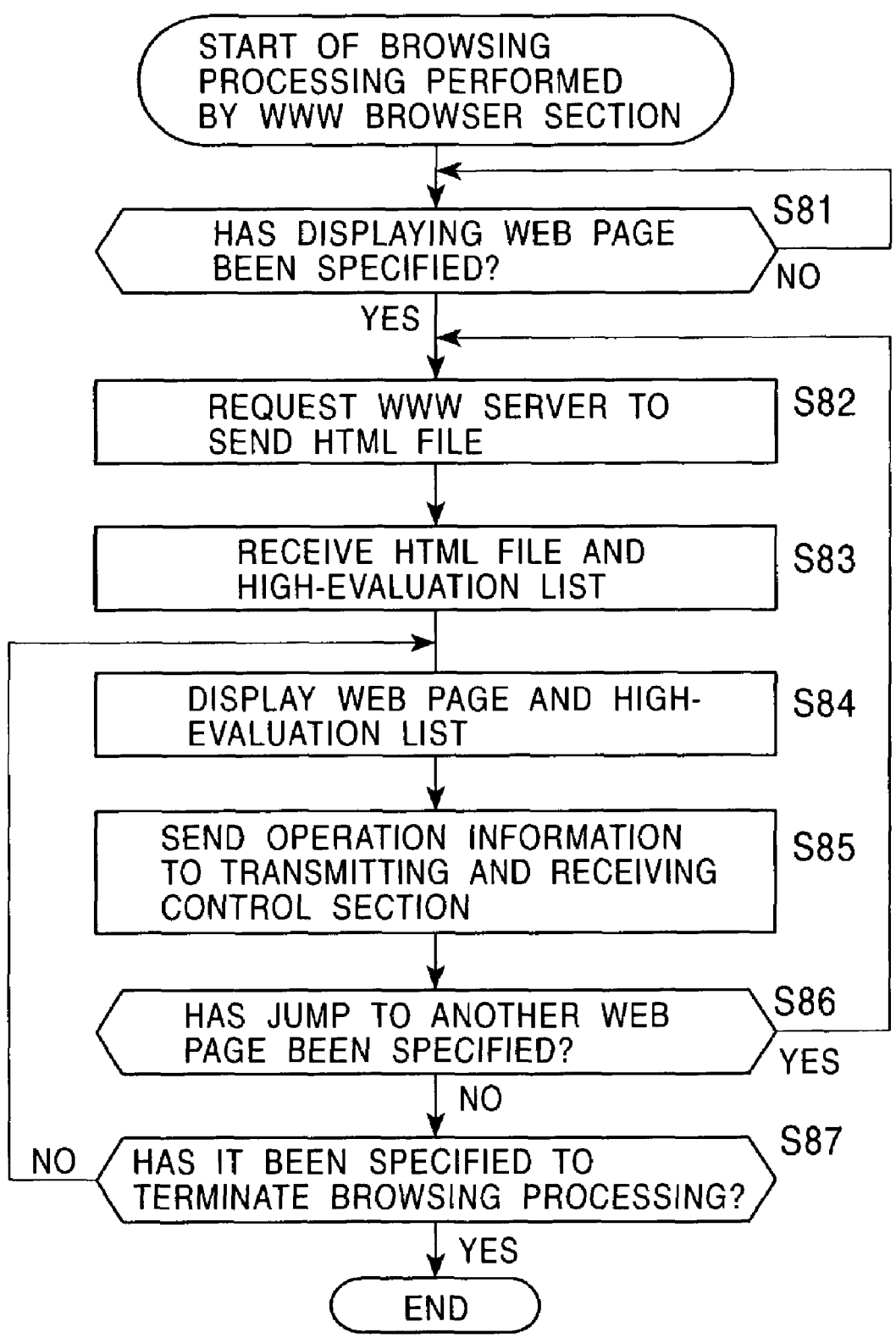
FIG. 17 is a flowchart describing the processing of a WWW browser section shown in FIG. 16.
Figure 18:
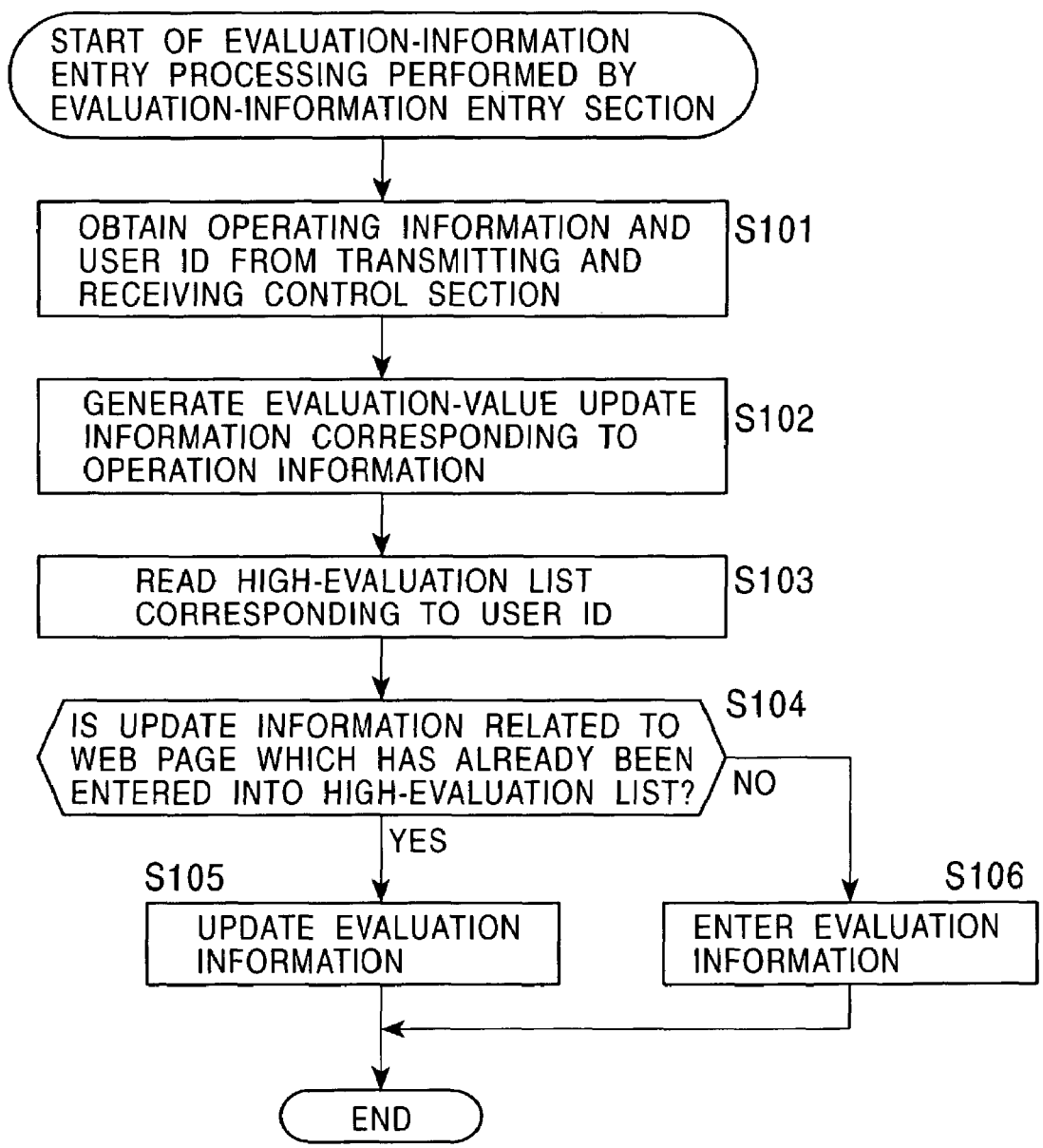
FIG. 18 is a flowchart describing the processing of an evaluation-information entry section shown in FIG. 16.
Figure 19:
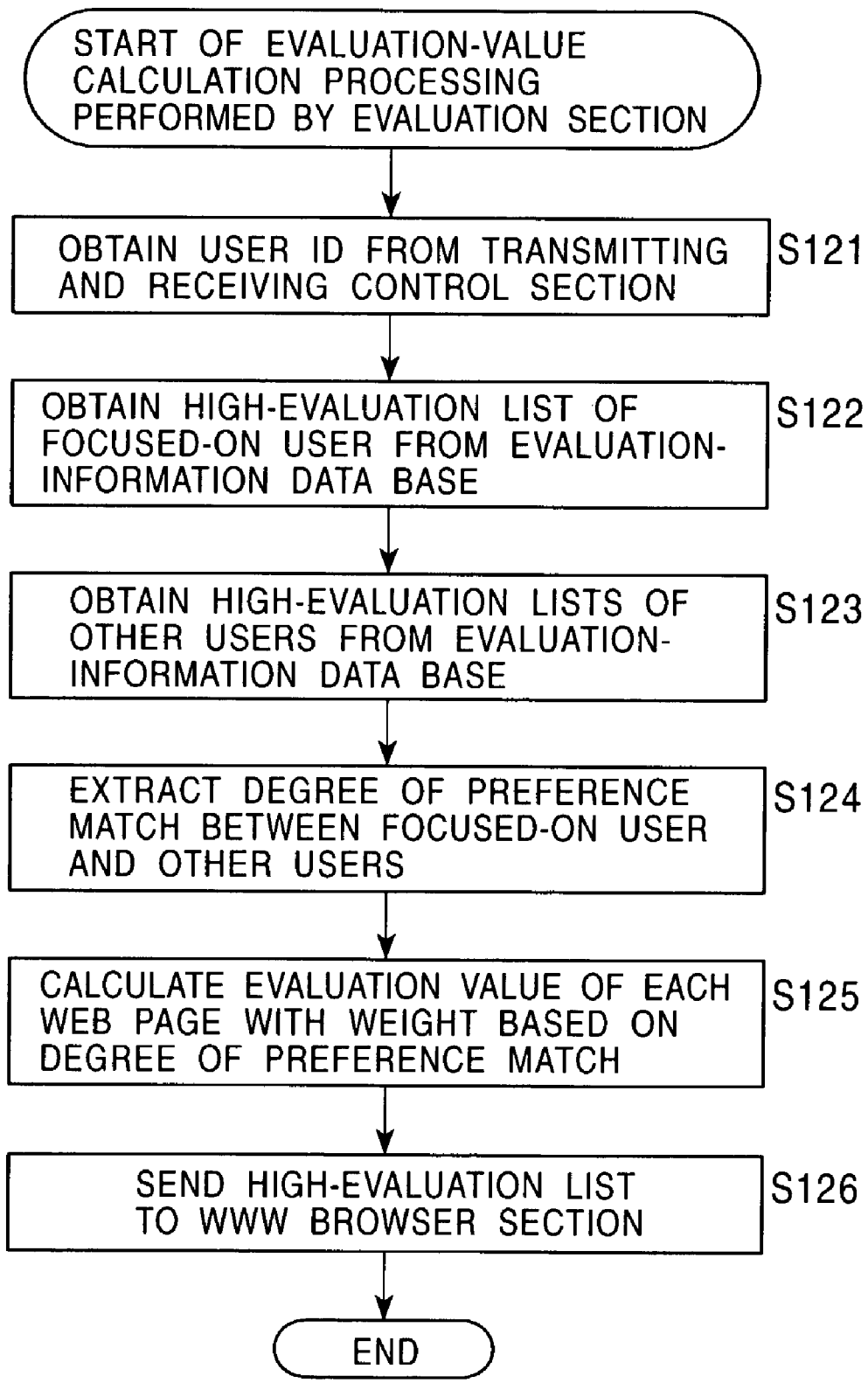
FIG. 19 is a flowchart describing processing performed by an evaluation section shown in FIG. 16.

The operation of each section in the network system shown in FIG. 16 will be described next by referring to flowcharts shown in FIG. 17 to FIG. 19. Browser processing performed by the WWW browser section 110 will be described first by referring to the flowchart shown in FIG. 17.

In step S81, the WWW browser section 110 determines, for example, whether an URL is input to a predetermined input column to specify that the web page be displayed. When it is determined that displaying the web page has been specified, the processing proceeds to step S82, and the WWW browser section 110 requests the WWW server 8 to send the HTML file. In addition, in step S82, the WWW browser section 110 requests the WWW server 82 to send the HTML file and reports the user ID to a transmitting and receiving control section 131.

In step S83, the WWW browser section 110 receives the HTML file sent from the WWW server 8, and a high-evaluation list sent from the transmitting and receiving control section 131 of the evaluation server 120. These pieces of received information is displayed on or output to the output section 27 in step S84.

In step S85, the WWW browser section 110 sends various types of operation information input by the user for the displayed web page to the transmitting and receiving control section 131 of the evaluation server 120.

The WWW browser section 110 reports, for example, the URL of the web page displayed in step S84 and that displaying starts, to the transmitting receiving control section 131. In response to this report, the evaluation server 120 starts counting a display period to measure the display period. When the user specifies that the displayed web page be entered into a bookmark, the WWW browser section 110 executes bookmark entry processing, reports that bookmark entry has been specified, to the evaluation server 120, and performs other processing. The evaluation server 120 calculates an evaluation value according to the various types of operation information sent from the WWW browser section 110, and updates the high-evaluation list. Processing performed by the evaluation server 120 will be described later by referring to a flowchart shown in FIG. 19.

In step S86, the WWW browser section 110 determines whether the user has specified a jump to another web page. When it is determined that a jump to another web page has been specified, the processing returns to step S82, and subsequent processes are repeatedly executed. When the WWW browser section 110 determines in step S86 that a jump to another web page has not been specified, the processing proceeds to step S87.

In step S87, the WWW browser section 110 determines whether the user has specified termination of the browser processing. When it is determined that termination has not been specified, the processing returns to step S84, the web page is continuously being displayed, and the process of sending operation information is executed in step S85 when an operation is input from the input section 26.

In contrast, when the WWW browser section 110 determines in step S87 that termination of the browser processing has been specified, the processing is terminated.

Evaluation-information entry processing performed by the evaluation-information entry section 133 will be described next by referring to a flowchart shown in FIG. 18.

In step S101, the evaluation-information entry section 133 obtains operation information reported according to various operations input by the user of the personal computer 1 for the displayed web page, and the user ID used for identifying the WWW browser section 110, from the transmitting and receiving control section 131.

In step S102, the evaluation-information entry section 133 generates evaluation-value update information corresponding to the operation contents according to the obtained operation information. Specifically, the evaluation-information entry section 133 stores in advance a relationship table between operation contents and evaluation values, such as that shown in FIG. 7 and described above. Therefore, when the evaluation-information entry section 133 obtains, for example, operation information that the user entered the "web page A" into a bookmark, from the transmitting and receiving control section 131 in step S102, the evaluation-information entry section 133 can generate update information indicating that the evaluation value of the "web page A" is increased by 10 points, from the relationship table shown in FIG. 7.

In step S103, the evaluation-information entry section 133 reads the high-evaluation list corresponding to the user ID obtained in step S101, from an evaluation-information data base 134. Then, in step S104, the evaluation-information entry section 133 determines whether the update information generated in step S102 is that related to a web page which has already been entered into the high-evaluation list.

When the evaluation-information entry section 133 determines in step S104 that the update information generated in step S102 is that related to a web page which has already been entered, the processing proceeds to step S105, and the evaluation-information entry section 133 updates evaluation information entered into the evaluation-information data base 134. When update information indicating that the evaluation value of the "web page A" is reduced by 10 points is generated, and the evaluation value of the "web page A" has already been entered into the high-evaluation list as 80 points, for example, the evaluation-information entry section 133 sets the evaluation value of the "web page A" to 70 points to update it in the evaluation-information data base 134.

In contrast, when the evaluation-information entry section 133 determines in step S104 that the update information generated in step S102 is that related to a web page which has not yet been entered into the high-evaluation list, the processing proceeds to step S106, and the evaluation-information entry section 133 enters evaluation information into the evaluation-information data base 134. When update information indicating that the evaluation value of the "web page A" is increased by 10 points, and it has been specified in advance that the initial value of a web page which has not yet been entered be set to 50 points, for example, the evaluation-information entry section 133 sets the evaluation value of the "web page A" to 60 points and enters it into the evaluation-information data base 134.

The above-described processing is repeatedly executed every time when update information is reported. The evaluation-information data base 134 stores the high-evaluation lists of a plurality of users.

Evaluation-value calculation processing performed by an evaluation section 132 will be described next by referring to the flowchart shown in FIG. 19.

In step S121, the evaluation section 132 obtains the user ID from the transmitting and receiving control section 131. In step S122, the evaluation section 132 sets the user specified by the user ID to a focused-on user, and obtains the high-evaluation list of the focused-on user from the evaluation-information data base 134. In step S123, the evaluation section 132 obtains the high-evaluation lists of users other than the focused-on user, from the evaluation-information data base 134.

In step S124, the evaluation section 132 extracts the degree of preference match between the focused-on user and the other users from the obtained high-evaluation lists by the above-described method. Specifically, the evaluation section 132 extracts the degree of preference match from the number of web pages entered in common into the high-evaluation lists of the focused-on user and the other users, as described, for example, by referring to FIG. 12 and FIG. 13.

Then, in step S125, the evaluation section 132 weights the evaluation values of web pages according to the degree of preference match extracted in step S124, in a way, for example, described by referring to FIG. 14 to calculate the evaluation value of each web page entered into the high-evaluation list.

In step S126, the evaluation section 132 sends the high-evaluation list to the WWW browser section 110 through the transmitting and receiving control section 131 at a predetermined timing. Then, the user can browse only web pages useful to the user.

In the above descriptions, the high-evaluation list generated for each user is provided by the evaluation and search server 7 or the evaluation server 120. A general evaluation list (evaluation list common to all users) generated according the evaluation values of all users for web pages may be provided in response to a request from the user.

Figure 20:
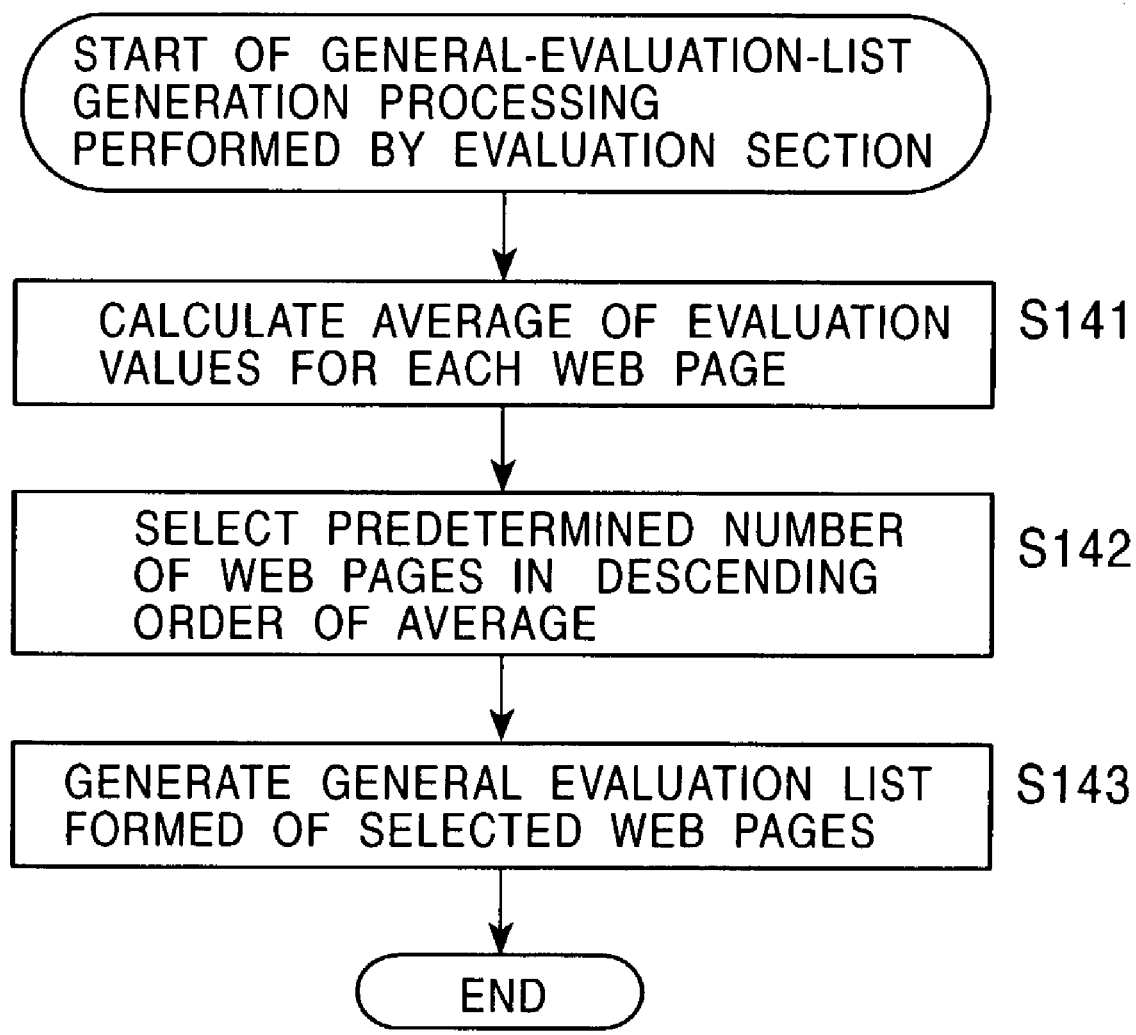
FIG. 20 is a flowchart describing another processing performed by the evaluation section shown in FIG. 16.

Processing performed by the evaluation section 132 shown in FIG. 16, for generating a general evaluation list will be described next by referring to a flowchart shown in FIG. 20. The evaluation section 95 shown in FIG. 6 also executes the same processing to generate a general evaluation list.

In step S141, the evaluation section 132 calculates the average of evaluation values for each web page according to evaluation information stored in the evaluation-information data base 134, as a general evaluation value. Specifically, the evaluation-information data base 134 stores the evaluation values of a plurality of users for each web page, and the evaluation section 132 uses them to calculate the average of the evaluation values.

In step S142, the evaluation section 132 selects a predetermined number of web pages in the descending order of the averages calculated in step S141, for example, selects up to the 100th web page. Then, in step S143, the evaluation section 132 generates a general evaluation list for the web pages selected in step S142, and stores it in the evaluation-information data base 134. The general evaluation list stored in the evaluation-information data base 134 is provided in response to a request from the user of the personal computer 1.

Also by referring to such a general evaluation list, the user can browse useful, that is, generally popular web pages only.

In the above descriptions, the evaluation and search server 7 and the evaluation server 120 provide the user with evaluation information for web pages. Evaluation information for various contents may be provided. If evaluation information for TV programs and radio programs is provided, for example, the evaluation and search server 7 and the evaluation server 120 update an evaluation value when the user switches the channel at timing, for example, when a CM (commercial message) appears during the broadcasting of the program. When such an operation is performed, since it is likely that the user intensively had viewed the program which had been output before the channel was switched, the evaluation and search server 7 and the evaluation server 120 generate update information which increases the evaluation value. Since it is likely that the user is interested in a program being output for a predetermined period after a channel switching operation was continuously performed, also when such an operation is performed, update information which increases the evaluation value is generated. In this case, a TV receiver which outputs TV programs and a radio receiver which outputs radio programs are provided with a communication section for reporting various types of operation information to the evaluation and search server 7 and to the evaluation server 120.

A network system for providing evaluation information related to a TV program, a radio program, or streaming contents provided by the Internet and others (hereinafter, if it is not necessary to individually distinguish a TV program, a radio program, and streaming contents, they are collectively called broadcasting contents), to which the present invention is applied will be described next.

Figure 21:
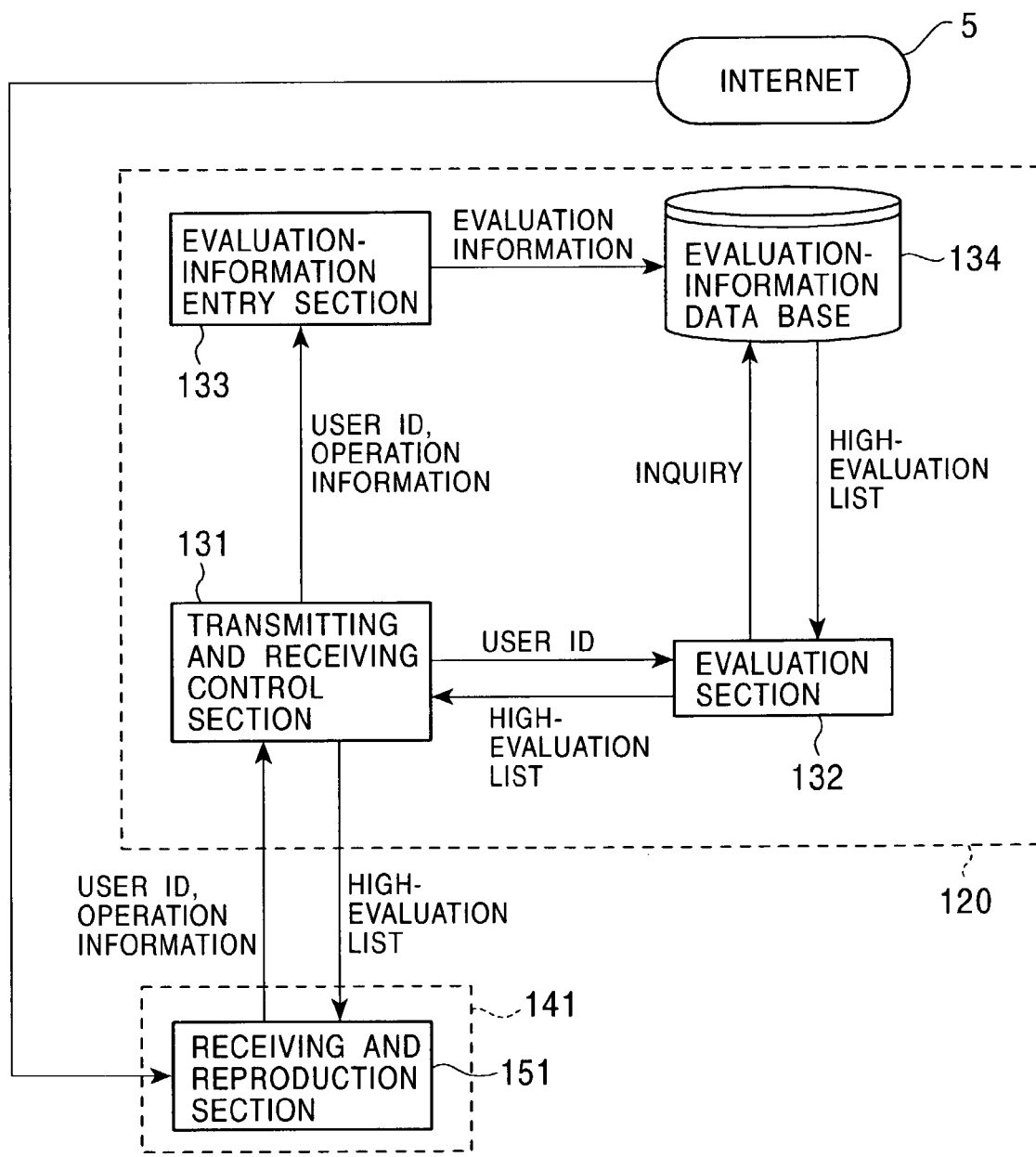
FIG. 21 is a block diagram showing an another example functional structure of the network system to which the present invention is applied.

FIG. 21 is a block diagram showing an example functional structure of the network system for providing evaluation information related to broadcasting contents. Since the network system shown in FIG. 21 basically has a structure similar to that of the network system shown in FIG. 16, a description of overlapping portions is omitted.

A receiving and reproduction section 151 of a receiving and reproduction apparatus 141 receives a broadcasting wave not shown, and reproduces the TV program or the radio program. The receiving and reproduction section 151 also downloads streaming contents distributed by a predetermined WWW server, developed on the Internet 5, and reproduces it.

When the user performs an operation related to an evaluation value, described later, during the reproduction of broadcasting contents, the receiving and reproduction section 151 generates operation information specifying the operation content, and sends it to the evaluation server 120 together with the user ID.

The evaluation-information entry section 133 of the evaluation server 120 generates evaluation information according to the operation information, updates the high-evaluation list of the user of the receiving and reproduction apparatus 141, stored in the evaluation-information data base 134, and performs others. As in the network system described by referring to FIG. 16 and others, the evaluation-information data base 134 stores the evaluation information of each user, related to broadcasting contents.

When the evaluation-information entry section 133 receives the operation contents applied to the broadcasting contents being reproduced by the receiving and reproduction apparatus 141, the evaluation-information entry section 133 updates an evaluation value for the broadcasting contents according to, for example, an example relationship such as that shown in FIG. 22.

In the example shown in FIG. 22, when a CM was broadcasted during a period when a TV program was being reproduced, and the channel was switched immediately after that, since it is likely that the user intensively had viewed the program which had been reproduced immediately before the channel was switched, the evaluation value of he program (broadcasting contents) is increased by 10 points. When the channel was continuously switched, and then, a predetermined channel is selected, since it is likely that the user is interested in the program of the selected channel, the evaluation value of the program of the channel is increased by 10 points. In this way, an evaluation value is reduced or increased in response to various operations.

Processing performed by the receiving and reproduction section 151 of the receiving and reproduction apparatus 141 for reproducing broadcasting contents will be described next by referring to a flowchart shown in FIG. 23.

In step S151, the receiving and reproduction section 151 receives broadcasting contents specified by the user. The processing proceeds to step S152, and the receiving and reproduction section 151 outputs the broadcasting contents. For example, the receiving and reproduction section 151 reproduces streaming contents distributed on the Internet, or a TV program provided through a broadcasting wave.

In step S153, the receiving and reproduction section 151 determines whether the user has specified that transmission of a high-evaluation list be requested from the evaluation server 120. When it is determined that the user has specified, the processing proceeds to step S154.

In step S154, the receiving and reproduction section 151 requests the evaluation server 120 to send a high-evaluation list related to the user of the receiving and reproduction apparatus 141. The evaluation server 120 performs, for example, processing similar to that shown in FIG. 19, and sends back the high-evaluation list related to the generated broadcasting contents.

In step S155, the receiving and reproduction section 151 receives the high-evaluation list sent from the evaluation server 120. The processing proceeds to step S156, and the receiving and reproduction section 151 displays the list. In contrast, when it is determined in step S153 that it has not been specified that transmission of the high-evaluation list be requested, the processes of step S154 to step S156 are skipped.

In step S157, the receiving and reproduction section 151 determines whether the user has performed an operation which affects the evaluation for the broadcasting contents output in step S152. When it is determined that an operation such as those (operations such as "switching the channel immediately after a CM is broadcasted," and "selecting a predetermined channel after the channel is continuously switched") shown in FIG. 22 has been performed, for example, the processing proceeds to step S158.

In step S158, the receiving and reproduction section 151 sends information specifying the operation performed by the user, the user ID, information identifying the broadcasting contents being reproduced, and others to the evaluation server 120. The evaluation sever 120 updates the evaluation value according to the operation information and others sent from the receiving and reproduction apparatus 141, and performs others.

In contrast, when the receiving and reproduction section 151 determines in step S157 that an operation which affects the evaluation has not been performed, the process of step S158 is skipped and the processing proceeds to step S159.

In step S159, the receiving and reproduction section 151 determines whether channel switching (switching broadcasting contents to be output) has been specified. When it is determined that channel switching has been specified, the processing returns to step S151, and subsequent processes are repeatedly executed.

In contrast, when the receiving and reproduction section 151 determines in step S159 that channel switching has not been specified, the processing proceeds to step S160, and then, the receiving and reproduction section 151 determines whether the user has specified termination of the processing.

When the receiving and reproduction section 151 determines in step S160 that the user has not specified termination of the processing, the processing returns to step S153, and subsequent processes are repeatedly performed. In contrast, when the receiving and reproduction section 151 determines that the user has specified termination of the processing, the processing is terminated.

With processing such as that described above, the user can use the high-evaluation list provided by the evaluation server 120 to select only popular broadcasting contents and view them. A general evaluation list related to broadcasting contents may be generated by processing similar to that shown in FIG. 20 and provided.

In the above description, the evaluation server 120 calculates an evaluation value according to operation information sent from the receiving and reproduction section 151. The receiving and reproduction section 151 may calculate an evaluation value according to an operation performed by the user and report it to the evaluation server 120. In this case, the receiving and reproduction section 151 has in advance an example relationship between operation contents and evaluation values, such as that shown in FIG. 22.

The evaluation server 120 stores an evaluation value calculated and reported by the receiving and reproduction apparatus 141, and generates a high-evaluation list or a general evaluation list according to stored information.

Figure 24:
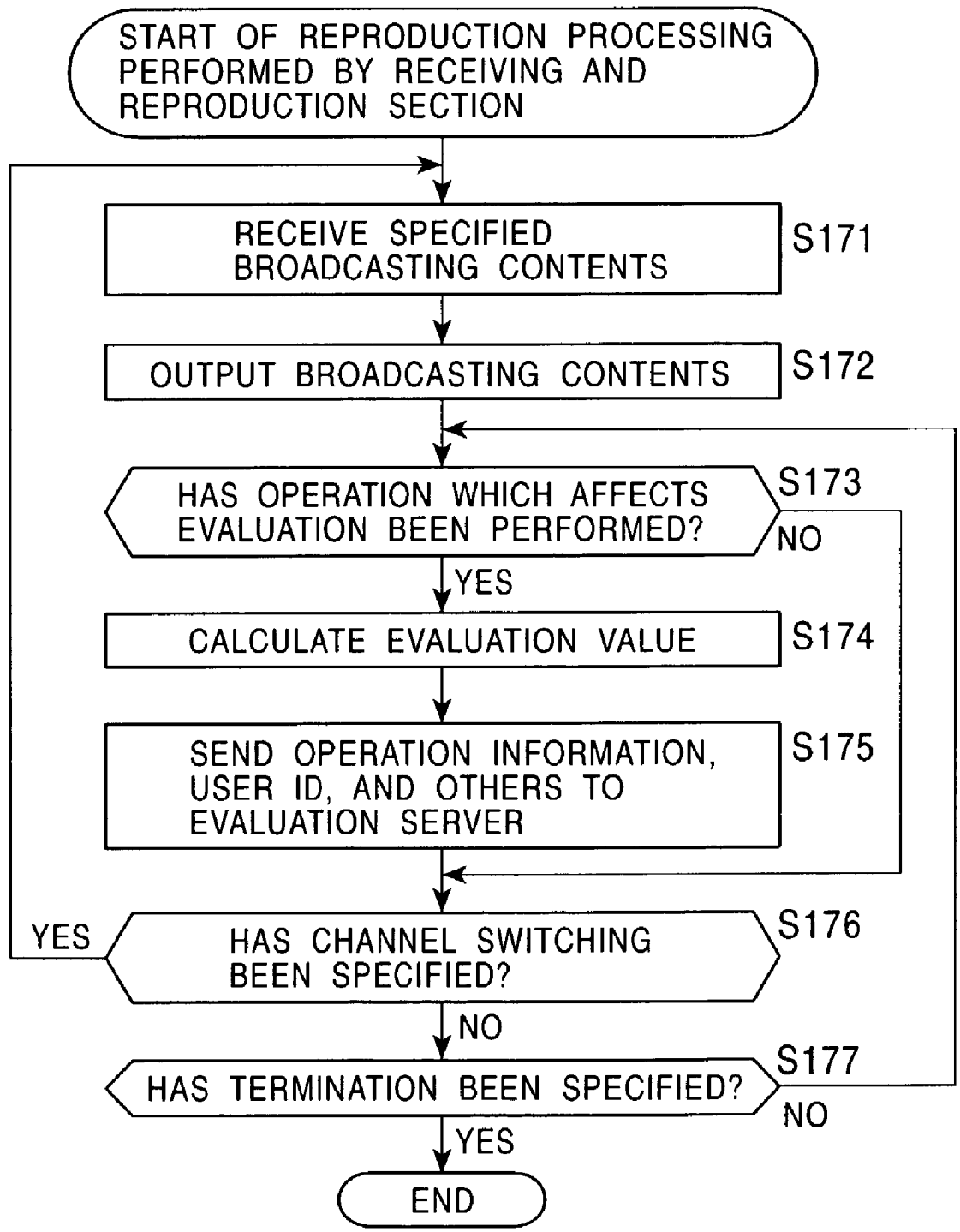
FIG. 24 is a flowchart describing another processing performed by the receiving and reproduction section shown in FIG. 21.

FIG. 24 is a flowchart showing processing performed by the receiving and reproduction section 151 for reproducing broadcasting contents.

Figure 23:
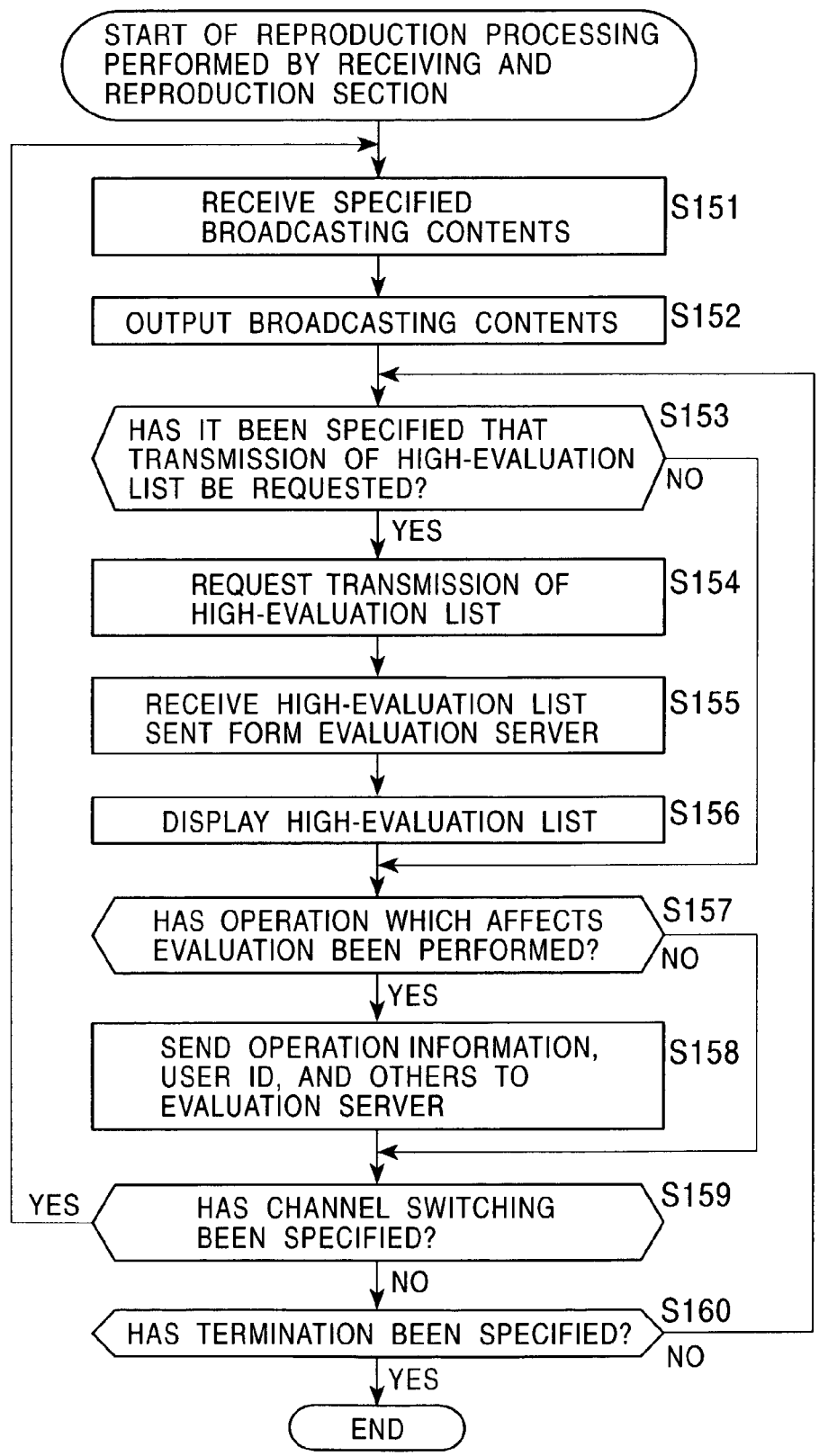
FIG. 23 is a flowchart describing processing performed by a receiving and reproduction section shown in FIG. 21.

The processing shown in FIG. 24 is basically similar to that described by referring to FIG. 23. Specifically, the receiving and reproduction section 151 receives broadcasting contents specified by the user, in step S171, and outputs the broadcasting contents in step S172.

In step S173, the receiving and reproduction section 151 determines whether the user has performed an operation which affects the evaluation for the broadcasting contents output in step S172. When it is determined that such an operation has been performed, the processing proceeds to step S174.

In step S174, the receiving and reproduction section 151 calculates an evaluation value according to the operation performed by the user. When the receiving and reproduction section 151 has already managed the evaluation value of certain broadcasting contents, and the broadcasting contents are again selected after the channel is continuously switched, for example, the receiving and reproduction section 151 adds 10 points to the managed evaluation value to calculate a new evaluation value. When the receiving and reproduction section 151 has not managed the evaluation values of any broadcasting contents, and a program is selected after the channel is continuously switched, the receiving and reproduction section 151 adds 10 points to the initial value of the evaluation value of the selected program to calculate the evaluation value.

In step S175, the receiving and reproduction section 151 sends the evaluation value calculated in step S174, the user ID, information identifying the broadcasting contents for which the evaluation value was calculated, and others to the evaluation server 120.

In step S176, the receiving and reproduction section 151 determines whether the user has specified channel switching. When it is determined that channel switching has been specified, the processing returns to step S171, and subsequent processes are repeatedly executed.

In contrast, when the receiving and reproduction section 151 determines in step S176 that channel switching has not been specified, the processing proceeds to step S177. When it is determined that termination of the processing has been specified, the processing is terminated.

Also with processing such as that described above, the evaluation server 120 can generate a high-evaluation list or a general evaluation list, and the user can use the list to view only useful broadcasting contents.

Figure 25:
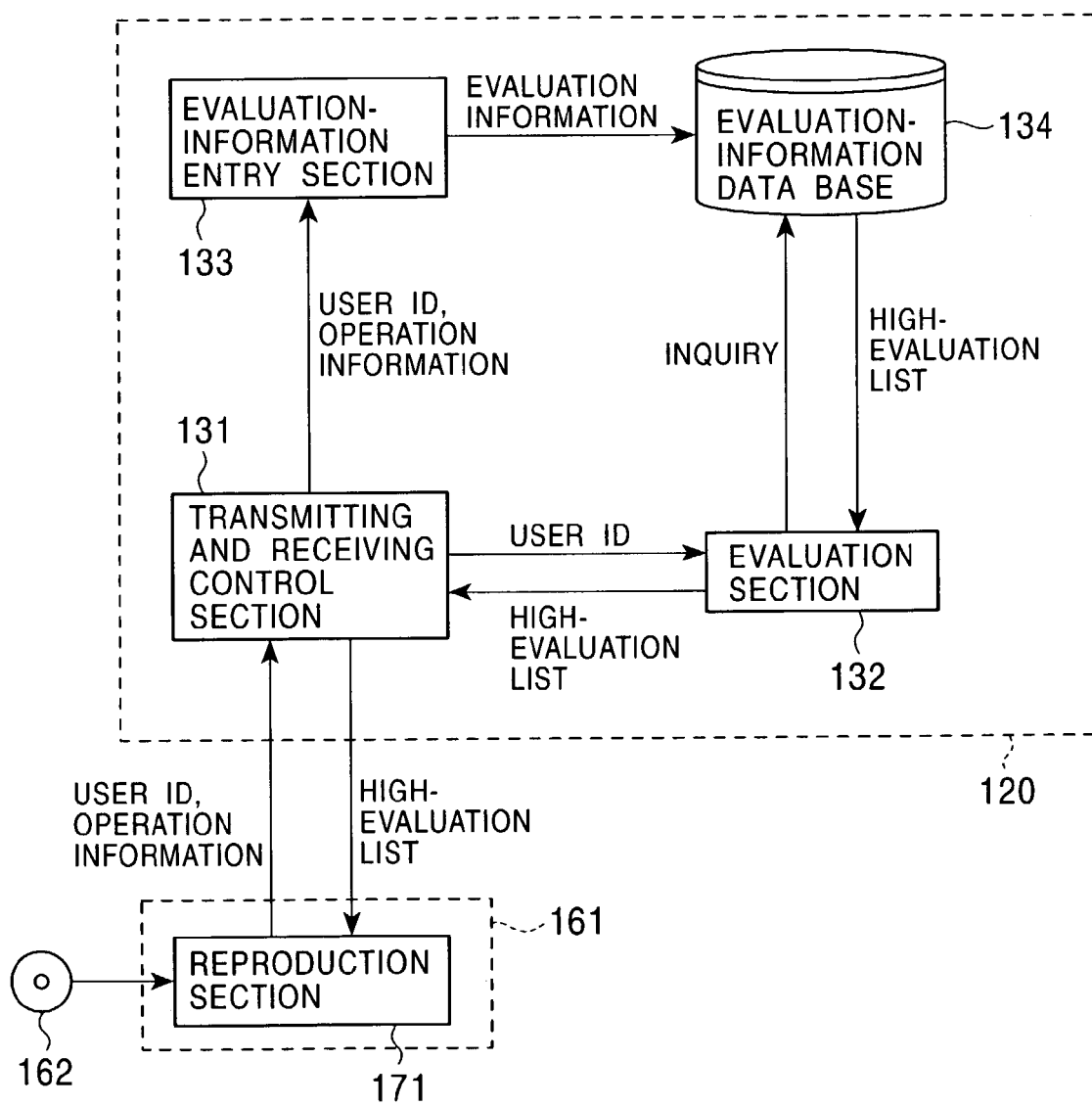
FIG. 25 is a block diagram showing a still another example functional structure of the network system to which the present invention is applied.

FIG. 25 is a block diagram showing an example functional structure of still another network system to which the present invention is applied.

In the network system shown in FIG. 25, the evaluation server 120 provides evaluation information related to contents (hereinafter called recording-medium contents), if necessary) provided for the user and stored in a recording medium, such as a DVD (digital versatile disc), a CD (compact disk), an MD (Mini-Disk), or a VTR (video tape recorder).

Specifically, a reproduction section 171 of a reproduction apparatus 161 reproduces contents recorded in a recording medium 162 mounted to the reproduction apparatus 151, and when the user performs a certain operation which affects the evaluation of the contents being reproduced, reports operation information specifying the operation to the evaluation server 120.

The evaluation server 120 updates evaluation information according to the operation information reported from the reproduction apparatus 161, generates the high-evaluation list of contents related to the user of the reproduction apparatus 161, if necessary, and provides the list.

For example, the evaluation-information entry section 133 of the evaluation server 120 calculates the evaluation value of contents reproduced by the reproduction apparatus 161 according to an example relationship such as that shown in FIG. 26.

In the example shown in FIG. 26, when the reproduction speed (fast forward, rewind, pause, frame feed, slow reproduction, and others) of contents was changed during the reproduction of the contents stored in a DVD or others, since it is likely that the user was interested in the contents, the evaluation value of the contents is increased by 10 points. When a part of contents was rewound and the contents were played back at a predetermined position, or when the reproduction of contents was paused, and then restarted at the paused position, the evaluation value of the contents is increased by 10 points. In other words, especially when the reproduction of contents was paused, and then restarted at the paused position, its operation information indicates that, although the user once had stopped viewing the contents, the user again viewed the contents.

Figure 27:
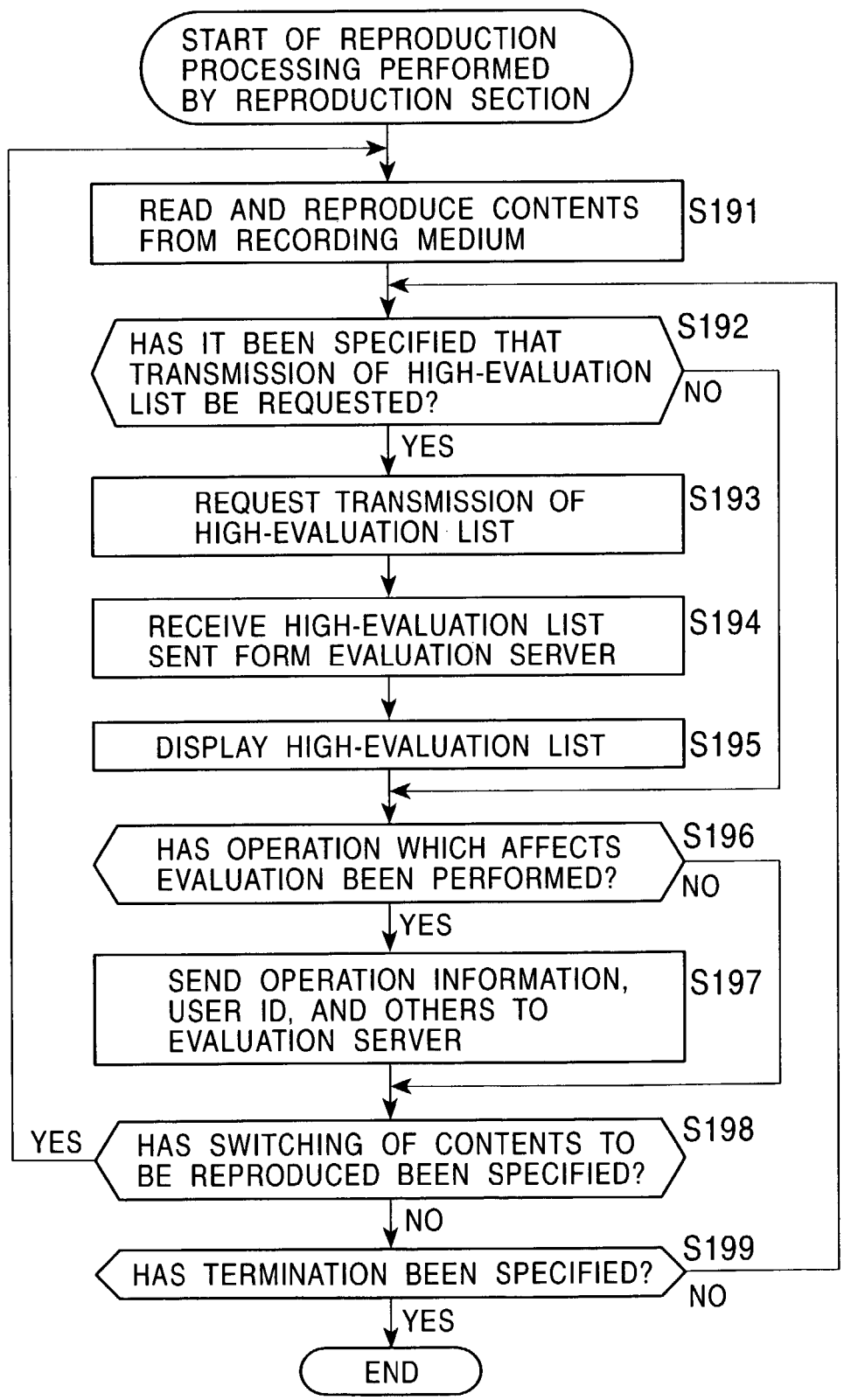
FIG. 27 is a flowchart describing processing performed by a reproduction section shown in FIG. 25.

Processing performed by the reproduction section 171 of the reproduction apparatus 161 for reproducing contents stored in a recording medium will be described next by referring to a flowchart shown in FIG. 27. This processing is basically similar to that performed by the receiving and reproduction apparatus 141 described by referring to FIG. 23.

Specifically, in step S191, the reproduction section 171 reads and reproduces contents recorded in the recording medium 162 mounted to the reproduction apparatus 161.

When the reproduction section 171 determines in step S192 that the user has specified that transmission of a high-evaluation list be requested from the evaluation server 120, the processing proceeds to step S193.

In step S193, the reproduction section 171 requests the evaluation server 120 to send a high-evaluation list related to the user of the reproduction apparatus 161 for the contents recorded in the recording medium. The processing proceeds to step S194, and the reproduction section 171 receives the high-evaluation list sent from the evaluation server 120. The reproduction section 171 displays the received high-evaluation list in step S195.

When the reproduction section 171 determines in step S196 that the user has performed an operation (such as "changing the reproduction speed of the contents," "reproducing the contents after rewinding," or "reproducing at a paused position") which affects the evaluation, such as those shown in FIG. 26, for the contents output in step S191, the processing proceeds to step S197.

In step S197, the reproduction section 171 sends information specifying the operation performed by the user, the user ID, information identifying the recording-medium contents being reproduced, and others to the evaluation server 120. The evaluation sever 120 updates the evaluation value according to the operation information and others sent from the reproduction apparatus 161, and performs others.

Then, when the reproduction section 171 determines in step S198 that switching of contents to be reproduced has not been specified, and further, the reproduction section 171 determines in step S199 that the user has specified termination of the processing, the processing is terminated.

With processing such as that described above, the user can use the high-evaluation list provided by the evaluation server 120 to check popular recording-medium contents. A general evaluation list related to recording-medium contents may be generated by processing similar to that shown in FIG. 20 and provided by the evaluation server 120.

In addition, in the same way as for the above-described receiving and reproduction apparatus 141, the reproduction section 171 may calculate an evaluation value according to an operation performed by the user and report it to the evaluation server 120. In this case, the reproduction section 171 has in advance an example relationship between operation contents and evaluation values, such as that shown in FIG. 26.

Figure 28:
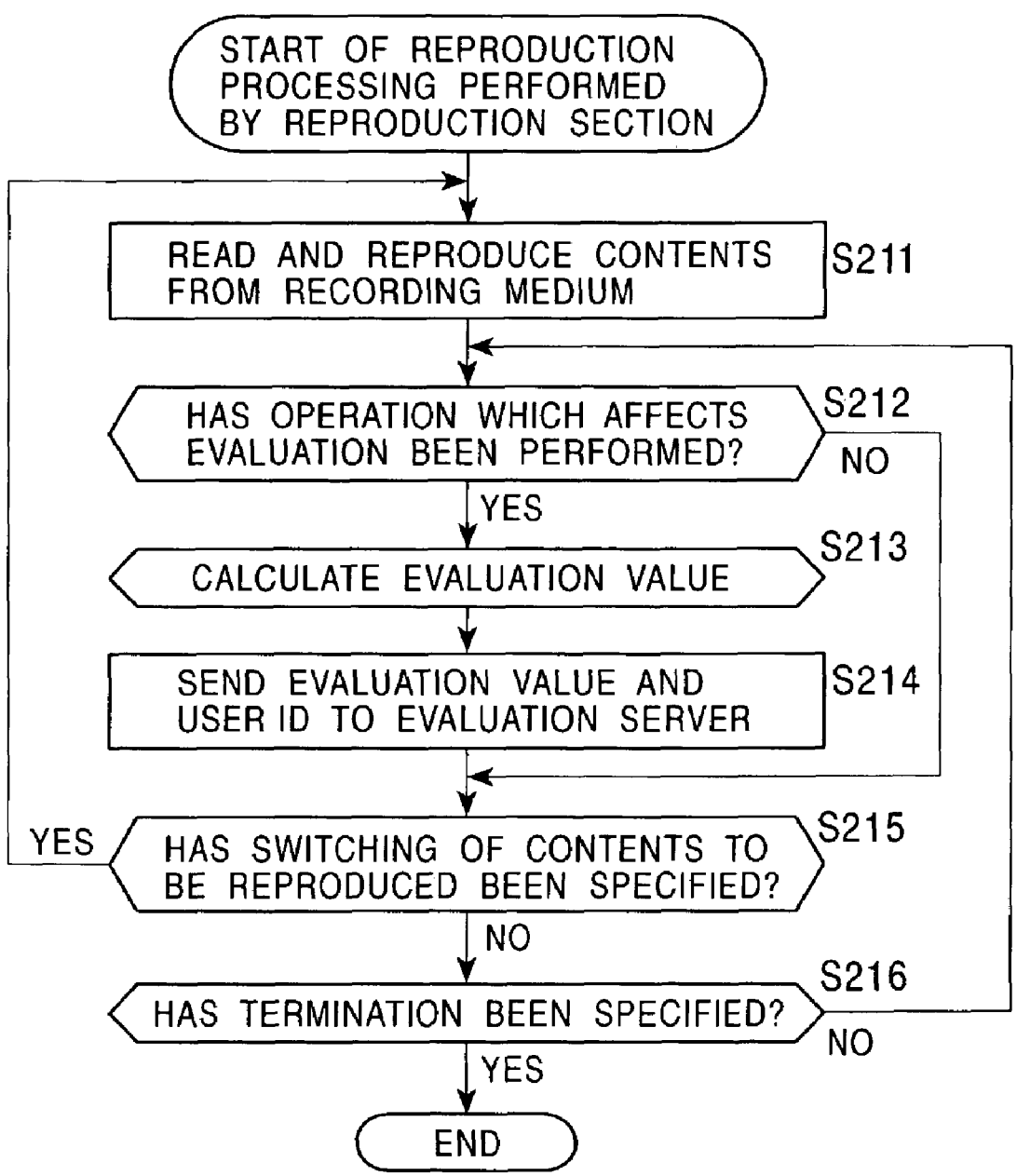
FIG. 28 is a flowchart describing another processing performed by the reproduction section shown in FIG. 25.

Processing for calculating an evaluation value according to an operation performed by the user and for sending the evaluation value to the evaluation server 120, performed by the reproduction section 171 will be described next by referring to a flowchart shown in FIG. 28.

In step S211, the reproduction section 171 reads and reproduces contents recorded in the recording medium 162.

When the reproduction section 171 determines in step S212 that the user has performed an operation which affects the evaluation for the reproduced contents, the processing proceeds to step S213, and the reproduction section 171 calculates an evaluation value according to the operation performed by the user.

When the reproduction section 171 manages the evaluation value of recording-medium contents, and the reproduction of the recording-medium contents is paused and then restarted at the paused position, the reproduction section 171 adds 10 points to the managed evaluation value to calculate a new evaluation value.

In step S214, the reproduction section 171 sends the evaluation value calculated in step S213, the user ID, information identifying the recording-medium contents for which the evaluation value was calculated, and others to the evaluation server 120.

In step S215, the reproduction section 171 determines whether switching of contents to be reproduced has been specified. When it is determined that switching has been specified, the processing returns to step S211, and subsequent processes are repeatedly performed.

When the reproduction section 171 determines in step S215 that switching of contents to be reproduced has not been specified, the processing proceeds to step S216, and when it is determined that termination of the processing has been specified, the processing is terminated.

With processing such as that described above, the user can check evaluation information for contents recorded in a recording medium such as a DVD.

In addition, the evaluation server 120 and others may evaluate not only contents reproduced by the receiving and reproduction apparatus 141 or the reproduction apparatus 161, described above, but also, for example, multimedia data such as various image data and audio data, programs, and data generated by an application program.

The above-described series of processing can be executed not only by hardware but also by software.

When the series of processing is executed by software, a program constituting the software is installed from a network or a recording medium into a computer which is built in special hardware, or into a machine, such as a general-purpose personal computer 1, which can execute various functions by installing various programs.

The recording medium is formed not only of a package medium, such as a magnetic disk 31 (including a floppy disk), an optical disk 32 (including a CD ROM and a DVD), a magneto-optical disk 33 (including an MD (Mini Disk)), or a semiconductor memory 34, into which the program is recorded and which is distributed to provide the user with the program separately from the apparatus body, but also of the ROM 22, which records a program, or a hard disk included in the storage section 28, which has been embedded in advance in the apparatus body and is provided for the user, as shown in FIG. 2.

In the present specification, steps describing the program recorded in a recording medium include not only processing to be executed in a time-sequential manner in a described order but processing which is not necessarily executed time-sequentially but is executed in parallel or independently.

In the present specification, a system refers to an entire apparatus formed of a plurality of units.

INDUSTRIAL APPLICABILITY

As described above, according to the present invention, the user can easily obtain higher-quality contents.

The invention claimed is:

1. An information processing apparatus, the apparatus including a combination of hardware elements and software elements, comprising:
    a viewing-action-information collecting unit configured to collect viewing-action information representing viewing action of a user for content;
    an evaluation calculation unit configured to calculate an evaluation value of each user for the content according to the viewing-action information collected by the viewing-action-information collecting unit;
    an evaluation-information storage unit configured to store evaluation information representing the evaluation value calculated by the evaluation calculation unit, an evaluation-information list for each user, formed of a predetermined number of the evaluation information in descending order of the evaluation value, being stored in the evaluation storage unit;
    an evaluation-information providing unit configured to provide each user with their own list among the evaluation-information lists stored by the evaluation-information storage unit and a weighted evaluation for each content in the list; and
    a degree-of-similarity calculation unit configured to calculate degree of similarity of preferences between a focused-on user being focused on and other users according to the evaluation-information list of the focused-on user and those of the other users, stored by the evaluation-information storage unit;
    wherein the viewing-action-information collecting unit collects information representing operation content applied by the user, in a reproduction apparatus for reproducing recording-medium content stored in a predetermined recording medium, to the recording-medium content, as the viewing-action information;
    wherein the evaluation calculation unit calculates the evaluation value of each user for the recording-medium content according to the viewing-action information collected by the viewing-action-information collecting unit;
    wherein the evaluation calculation unit weights the evaluation values of the other users for predetermined contents according to the degrees of similarity calculated by the degree-of-similarity calculation unit, adds obtained values to calculate the evaluation value of the focused-on user for the predetermined contents, the degree of similarity representing a number of common evaluation information in the evaluation-information lists for the focused-on user and other users; and
    wherein the evaluation calculation unit produces the weighted evaluation for the content as a result of the calculation,
    wherein the evaluation calculation unit increases the evaluation value by a predetermined value when the viewing-action information indicates that the reproduction of the recording-medium content had been paused, and then was restarted at a paused position, and
    wherein the evaluation values are updated every time that update information is generated based on counting display time of the content.

2. An information processing apparatus according to claim 1, wherein
    the viewing-action-information collecting unit collects information representing a time when the user outputs the content, as the viewing-action information.

3. An information processing apparatus according to claim 1, wherein
    the viewing-action-information collecting unit collects operation information representing the content of an operation applied by the user to an output apparatus where the content is output, as the viewing-action information.

4. An information processing apparatus according to claim 3, wherein
    the viewing-action-information collecting unit collects the operation information in which the user specifies recording of the content.

5. An information processing apparatus according to claim 1, wherein
the evaluation calculation unit calculates the average of the evaluation values of a plurality of users for the content.

6. An information processing apparatus according to claim 1, wherein
the evaluation-information storage unit stores the evaluation information for web-page information, calculated by the evaluation calculation unit, and
the evaluation-information providing unit provides an URL which specifies web-page information corresponding to a predetermined condition, and the evaluation information of each user for the web-page information corresponding to the condition.

7. An information processing apparatus according to claim 6, wherein
the viewing-action-information collecting unit collects information representing a time when the user outputs the web-page information, as the viewing-action information.

8. An information processing apparatus according to claim 6, wherein
the viewing-action-information collecting unit collects information indicating that the user specifies that the web-page information be entered into a bookmark, as the viewing-action information.

9. An information processing apparatus according to claim 6, wherein
the viewing-action-information collecting unit collects information indicating that the user specifies that the web-page information be printed, as the viewing-action information.

10. An information processing apparatus according to claim 6, wherein
the viewing-action-information collecting unit collects information indicating that the user specifies that the web-page information be saved, as the viewing-action information.

11. An information processing apparatus according to claim 1, wherein
the viewing-action-information collecting unit collects information representing a viewing action applied by the user, in a receiving and reproduction apparatus for receiving broadcasting content and reproducing them, to the broadcasting content, as the viewing-action information, and
the evaluation calculation unit calculates the evaluation value of each user for the broadcasting content according to the viewing-action information collected by the viewing-action-information collecting unit.

12. An information processing apparatus according to claim 11, wherein
the viewing-action-information collecting unit collects switching-timing information representing timing when the channel for the broadcasting content is switched, as the viewing-action information, and
the evaluation calculation unit calculates the evaluation value according to the switching-timing information.

13. An information processing apparatus according to claim 12, wherein,
when the switching-timing information indicates that the channel has been switched immediately after a predetermined commercial message was broadcasted, the evaluation calculation unit increases the evaluation value for the broadcasting content which had been broadcasted immediately before the commercial message was broadcasted, by a predetermined value.

14. An information processing apparatus according to claim 12, wherein,
when the switching-timing information indicates that certain broadcasting content have been selected after the channel was continuously switched, the evaluation calculation unit increases the evaluation value for the selected broadcasting content, by a predetermined value.

15. An information processing apparatus according to claim 1, wherein
the evaluation calculation unit calculates the evaluation value according to the viewing-action information representing the reproduction speed of the recording-medium content, collected by the viewing-action-information collecting unit.

16. An information processing apparatus according claim 1, wherein
the evaluation calculation unit increases the evaluation value by a predetermined value when the viewing-action information indicates that the entire recording-medium content or a predetermined part thereof has been repeatedly being reproduced.

17. An information processing apparatus according to claim 1, wherein
the evaluation calculation unit increases the evaluation value by a predetermined value when the viewing-action information indicates that a predetermined part of the recording-medium content has been fast-forwarded.

18. An information processing apparatus according to claim 1, wherein
the evaluation calculation unit increases the evaluation value by a predetermined value when the viewing-action information indicates that the recording-medium content has been paused.

19. An information processing method comprising:
a viewing-action-information collecting step of collecting viewing-action information representing the viewing action of the user for content;
an evaluation calculation step of calculating the evaluation value of each user for the content according to the viewing-action information collected by a process in the viewing-action-information collecting step;
an evaluation-information storage step for storing evaluation information representing the evaluation value calculated by the evaluation calculation step, an evaluation-information list for each user, formed of a predetermined number of the evaluation information in the descending order of the evaluation value;
an evaluation-information providing step for providing each user with the their own list among the evaluation-information lists and a weighted evaluation for each content in the list;
a degree-of-similarity calculation step for calculating the degrees of similarity of preferences between a focused-on user being focused on and other users according to the evaluation-information list of the focused-on user and those of the other users;
wherein the viewing-action-information collecting step collects information representing operation content applied by the user, in a reproduction apparatus for reproducing recording-medium content stored in a predetermined recording medium, to the recording-medium content, as the viewing-action information; and
wherein the evaluation calculation step calculates the evaluation value of each user for the recording-medium content according to the viewing-action information collected in the viewing-action-information collecting step;

wherein the evaluation calculation step weights the evaluation values of the other users for predetermined contents according to the degrees of similarity calculated by the degree-of-similarity calculation step, adds obtained values to calculate the evaluation value of the focused-on user for the predetermined contents, the degree of a number of common evaluation information in the evaluation information lists for the focused-on user and other users;

wherein the evaluation calculation step produces the weighted evaluation for the content as a result of the calculation;

wherein the evaluation calculation step increases the evaluation value by a predetermined value when the viewing-action information indicates that the reproduction of the recording-medium content had been paused, and then was restarted at a paused position;

updating the evaluation values every time update information is generated based on counting display time of the content; and generating update information.

20. A recording medium storing a computer-readable program, the program comprising:

a viewing-action-information collecting control step of controlling the collection of viewing-action information representing the viewing action of the user for content;

an evaluation calculation step of calculating the evaluation value of each user for the content according to the viewing-action information collected by a process in the viewing-action-information collecting control step;

an evaluation-information storage step for storing evaluation information representing the evaluation value calculated, an evaluation-information list for each user, formed of a predetermined number of the evaluation information in the descending order of the evaluation value;

an evaluation-information providing step for providing each user with their own list among the evaluation-information lists and a weighted evaluation for each content in the list;

a degree-of-similarity calculation step for calculating the degrees of similarity of preferences between a focused-on user being focused on and other users according to the evaluation-information list of the focused-on user and those of the other users;

wherein the viewing-action-information collecting step collects information representing operation content applied by the user, in a reproduction apparatus for reproducing recording-medium content stored in a predetermined recording medium, to the recording-medium content, as the viewing-action information;

wherein the evaluation calculation step calculates the evaluation value of each user for the recording-medium content according to the viewing-action information collected in the viewing-action-information collecting step;

wherein the evaluation calculation step weights the evaluation values of the other users for predetermined contents according to the degrees of similarity calculated by the degree-of-similarity calculation step, adds obtained values to calculate the evaluation value of the focused-on user for the predetermined contents, the degree of similarity representing a number of common evaluation information in the evaluation-information lists for the focused-on user and other users; and wherein the evaluation calculation step produces the weighted evaluation for the content as a result of the calculation;

wherein the evaluation calculation step increases the evaluation value by a predetermined value when the viewing-action information indicates that the reproduction of the recording-medium content had been paused, and then was restarted at a paused position wherein the evaluation values are updated every time update information is generated based on counting display time of the content; and generating update information.

21. An information processing apparatus, the apparatus including hardware elements and software elements, comprising:

an output unit configured to output content;

a viewing-action-information generation unit configured to generate viewing-action information representing a viewing action of a user, according to an input applied to the content output from the output unit; and a communication unit configured to send the viewing-action information generated by the viewing-action-information generation unit to a second information processing apparatus and receive and evaluation-information list for each user, formed of a predetermined number of evaluation information in descending order of an evaluation value for the content according to the viewing-action information by the second information processing apparatus and a weighted evaluation for each content in the list;

a reproduction unit for reproducing recording-medium content stored in a predetermined recording medium; and an evaluation calculation unit for calculating an evaluation value for the recording-medium content according to operation information representing the content of an operation applied by the user to the recording-medium content reproduced by the reproduction unit, wherein the output unit outputs the recording-medium content reproduced by the reproduction unit, and the viewing-action-information generation unit generates the viewing-action information including the evaluation value calculated by the evaluation calculation unit, and wherein the each weighted evaluation is calculated by the second information processing apparatus which calculates the degrees of similarity of preferences between a focused-on user being focused on and other users according to the evaluation-information list of the focused-on user and those of the other users, weights the evaluation values of the other users for predetermined contents according to the degrees of similarity, the degree of similarity representing a number of common evaluation information in the evaluation information lists for the focused on user and other users, adds obtained values to calculate the evaluation value of the focused-on user for the predetermined contents, produces the weighted evaluation for the content as a result of the calculation, wherein the evaluation calculation unit increases the evaluation value by a predetermined value when the viewing-action information indicates that the reproduction of the recording-medium content had been paused, and then was restarted at a paused position, wherein the evaluation values are updated every time update information is generated based on counting display time of the content.

22. An information processing apparatus according to claim 21, wherein
the viewing-action-information generation unit generates information representing a time when the output unit outputs the content, as the viewing-action information.

23. An information processing apparatus according to claim 21, wherein
the viewing-action-information generation unit generates the viewing-action information according to operation information representing an operation content performed by the user.

24. An information processing apparatus according to claim 23, wherein
the viewing-action-information generation unit generates the viewing-action information according to the operation information specifying recording of the content.

25. An information processing apparatus according to claim 21, further comprising
a requesting unit managed by the another information processing apparatus, for requesting transmission of evaluation information representing an evaluation value serving as an evaluation for content.

26. An information processing apparatus according to claim 21, wherein
the viewing-action-information generation unit generates the viewing-action information according to information indicating that the user specifies that the web-page information be entered into a bookmark.

27. An information processing apparatus according to claim 21, wherein
the viewing-action-information generation unit generates the viewing-action information according to information indicating that the user specifies that the web-page information be printed.

28. An information processing apparatus according to claim 21, wherein
the viewing-action-information generation unit generates the viewing-action information according to information indicating that the user specifies that the web-page information be saved.

29. An information processing apparatus according to claim 21, further comprising:
acquisition unit for acquiring broadcasting content; and
evaluation calculation unit for calculating an evaluation value for the broadcasting content according to switching-timing information representing timing when the channel of the broadcasting content acquired by the acquisition unit is switched,
wherein the output unit displays the broadcasting content acquired by the acquisition unit; and
the viewing-action generation unit generates the viewing-action information including the evaluation value calculated by the evaluation calculation unit.

30. An information processing apparatus according to claim 29, wherein,
when the switching-timing information indicates that the channel has been switched immediately after a predetermined commercial message was broadcasted, the evaluation calculation unit increases the evaluation value for the broadcasting content which had been broadcasted immediately before the commercial message was broadcasted, by a predetermined value.

31. An information processing apparatus according to claim 29, wherein,
when the switching-timing information indicates that the channel had been continuously switched and then predetermined broadcasting content were selected, the evaluation calculation unit increases the evaluation value for the selected broadcasting content by a predetermined value.

32. An information processing apparatus according to claim 21, wherein
the evaluation calculation unit calculates the evaluation value according to the operation information representing the reproduction speed of the recording-medium content.

33. An information processing apparatus according to claim 21, wherein
the evaluation calculation unit increases the evaluation value by a predetermined value when the operation information indicates that the entire recording-medium content or a predetermined part thereof has been repeatedly reproduced.

34. An information processing apparatus according to claim 21, wherein
the evaluation calculation unit increases the evaluation value by a predetermined value when the operation information indicates that a predetermined part of the recording-medium content has been fast-forwarded.

35. An information processing apparatus according to claim 21, wherein
the evaluation calculation unit increases the evaluation value by a predetermined value when the operation information indicates that the recording-medium content has been paused.

36. An information processing apparatus according to claim 21, wherein
the evaluation calculation unit increases the evaluation value by a predetermined value when the operation information indicates that the reproduction of the recording-medium content had been paused, and then was restarted at a paused position.

37. An information processing method comprising:
an output step of outputting content;
a viewing-action-information generation step of generating viewing-action information representing a viewing action of a user, according to an input applied to the content output by a process in the output step;
a communication step of sending the viewing-action information generated by a process in the viewing-action-information generation step, to a second information processing apparatus and receive and evaluation-information list for each user, formed of a predetermined number of evaluation information in descending order of an evaluation value for the content according to the viewing-action information by the second information processing apparatus and a weighted evaluation for each content in the list;
a reproduction step of reproducing recording-medium content stored in a predetermined recording medium; and
an evaluation calculation step of calculating an evaluation value for the recording-medium content according to operation information representing the content of an operation applied by the user to the recording-medium content reproduced in the reproduction step,
wherein the output step outputs the recording-medium content reproduced in the reproduction step, and the viewing-action-information generation step generates the viewing-action information including the evaluation value calculated in the evaluation calculation step, and
wherein the each weighted evaluation is calculated by the second information processing apparatus which calculates the degree of similarity of preferences between a focused-on user being focused on and other users according to the evaluation-information list of the focused-on user and those of the other users;

weights the evaluation values of the other users for predetermined contents according to the degrees of similarity, the degree of similarity representing a number of common evaluation information in the evaluation information lists for the focused-on user and other users;

adds obtained values to calculate the evaluation value of the focused-on user for the predetermined contents;

produces the weighted evaluation for the content as a result of the calculation;

wherein the evaluation calculation step increases the evaluation value by a predetermined value when the viewing-action information indicates that the reproduction of the recording-medium content had been paused, and then was restarted at a paused position wherein the evaluation values are updated every time update information is generated based on counting display time of the content; and generating update information.

38. A recording medium recording a computer-readable program that is executed by a computer, the program comprising:

an output control step of outputting content;

a viewing-action-information generation step of generating viewing-action information representing a viewing action of a user, according to an input applied to the content output by a process in the output control step;

a communication control step of controlling transmission of the viewing-action information generated by a process in the viewing-action-information generation step, to a second information processing apparatus and receive and evaluation-information list for each user, formed of a predetermined number of evaluation information in descending order of an evaluation value for the content according to the viewing-action information by the second information processing apparatus and a weighted evaluation for each content in the list;

a reproduction step of reproducing recording-medium content stored in a predetermined recording medium; and an evaluation calculation step of calculating an evaluation value for the recording-medium content according to operation information representing the content of an operation applied by the user to the recording-medium content reproduced in the reproduction step, wherein the output step outputs the recording-medium content reproduced in the reproduction step, and the viewing-action-information generation step generates the viewing-action information including the evaluation value calculated in the evaluation calculation step, and wherein the each weighted evaluation is calculated by the second information processing apparatus which calculates the degrees of similarity of preferences between a focused-on user being focused on and other users according to the evaluation-information list of the focused-on user and those of the other users, weights the evaluation values of the other users for predetermined contents according to the degrees of similarity, the degree of similarity representing a number of common evaluation information in the evaluation-information lists for the focused-on user and other users, adds obtained values to calculate the evaluation value of the focused-on user for the predetermined contents, produces the weighted evaluation for the content as a result of the calculation, wherein the evaluation calculation unit increases the evaluation value by a predetermined value when the viewing-action information indicates that the reproduction of the recording-medium content had been paused, and then was restarted at a paused position;

wherein the evaluation values are updated every time update information is generated based on counting display time of the content; and generating update information based on said relationship.

* * * * *

UNITED STATES PATENT AND TRADEMARK OFFICE
CERTIFICATE OF CORRECTION

PATENT NO. : 7,599,987 B2 Page 1 of 1
APPLICATION NO. : 10/203116
DATED : October 6, 2009
INVENTOR(S) : Kondo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1057 days.

Signed and Sealed this

Twenty-eighth Day of September, 2010

David J. Kappos
*Director of the United States Patent and Trademark Office*